United States Patent
Li et al.

(10) Patent No.: US 12,335,368 B2
(45) Date of Patent: Jun. 17, 2025

(54) CRYPTOSYSTEM WITH UTILIZING SPLIT-RADIX DISCRETE GALOIS TRANSFORMATION

(71) Applicant: City University of Hong Kong, Hong Kong (HK)

(72) Inventors: Guangyan Li, Hong Kong (HK); Gaoyu Mao, Hong Kong (HK); Ray Chak Chung Cheung, Hong Kong (HK); Alan Hiu Fung Lam, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 164 days.

(21) Appl. No.: 18/337,391

(22) Filed: Jun. 19, 2023

(65) Prior Publication Data

US 2024/0430075 A1    Dec. 26, 2024

(51) Int. Cl.
  *H04L 9/00* (2022.01)
  *H04L 9/06* (2006.01)

(52) U.S. Cl.
  CPC ............ *H04L 9/0637* (2013.01); *H04L 9/065* (2013.01)

(58) Field of Classification Search
  CPC .............................. H04L 9/0637; H04L 9/065
  See application file for complete search history.

(56) References Cited

U.S. PATENT DOCUMENTS

| | | | |
|---|---|---|---|
| 11,265,163 B2 | 3/2022 | Poeppelmann | |
| 11,416,638 B2 * | 8/2022 | Banerjee | G06F 7/724 |
| 2012/0011184 A1 * | 1/2012 | Tang | G06F 17/142 |
| | | | 708/404 |
| 2013/0066932 A1 * | 3/2013 | Kwong | G06F 17/142 |
| | | | 708/204 |
| 2020/0097519 A1 * | 3/2020 | Huggett | G06F 17/142 |
| 2020/0265167 A1 | 8/2020 | Banerjee | |

(Continued)

OTHER PUBLICATIONS

G. Li, D. Chen, G. Mao, W. Dai, A. I. Sanka and R. C. C. Cheung, "Algorithm-Hardware Co-Design of Split-Radix Discrete Galois Transformation for KyberKEM," in IEEE Transactions on Emerging Topics in Computing, vol. 11, No. 4, pp. 824-838, Oct.-Dec. 2023, doi: 10.1109/TETC.2023.3270971. (Year: 2023).*

(Continued)

*Primary Examiner* — Syed M Ahsan
(74) *Attorney, Agent, or Firm* — Idea Intellectual Limited; Margaret A. Burke; Sam T. Yip

(57) ABSTRACT

A cryptosystem processor includes a twiddle factor memory, a SRDGT BFU, and a SPN. The twiddle factor memory has ZETA ports. The at least one SRDGT BFU has six input ports and four output ports and switchable among operation in DGT/IDGT/CWM mode, in which two of the input ports electrically communicate with the ZETA ports, respectively. The SRDGT BFU is configured to read and write two data points when working under the DGT/IDGT mode and is configured to read and write four data points when working under the CWM mode. The SPN electrically communicates with the SRDGT BFU and has at least one dual-port BRAM serving as memory cache configured to store polynomial, in which the SPN is configured to support the required number of data points reading or writing per cycle in the DGT/IDGT/CWM mode.

14 Claims, 15 Drawing Sheets

(56) References Cited

U.S. PATENT DOCUMENTS

2021/0157602 A1* 5/2021 Akoglu ............... G06F 12/0284

OTHER PUBLICATIONS

P. W. Shor, "Algorithms for quantum computation: discrete logarithms and factoring," IEEE, 1994, pp. 124-134.
J. Bos et al., "CRYSTALS-Kyber: a CCA-secure module-lattice-based KEM," IEEE, 2018, pp. 353-367.
Jeffrey Hoffstein et al., "NTRU: A ring-based public key cryptosystem," Springer, 1998, pp. 267-288.
J.-P. D'Anvers et al., "Saber: Module-LWR based key exchange, CPA-secure encryption and CCA-secure KEM," Springer, 2018, pp. 282-305.
D. J. Bernstein et al., "Classic McEliece: conservative code-based cryptography," NIST submissions, 2017, pp. 1-38.
D. Moody et al., "Status Report on the Second Round of the NIST Post-Quantum Cryptography Standardization Process," NIST, 2020, pp. 1-39.
V. B. Dang, F. Farahmand et al., "Implementation and benchmarking of round 2 candidates in the NIST post-quantum cryptography standardization process using hardware and software/hardware co-design approaches," Cryptology ePrint Archive: Report 2020/795, 2020, pp. 1-86.
H. Nejatollahi et al., "Flexible NTT Accel-erators for RLWE Lattice-Based Cryptography," IEEE, 2019, pp. 329-332.
Y. Xing et al., "A compact hardware implementation of CCA-secure key exchange mechanism Crystals-Kyber on FPGA," IACR Transactions on Cryptographic Hardware and Embedded Systems, 2021, vol. 2021 (2), pp. 328-356.
N. Zhang et al., "Highly efficient architecture of NewHope-NIST on FPGA using low-complexity NTT/INTT," IACR Transactions on Cryptographic Hard-ware and Embedded Systems, 2020, vol. 2020 (2), pp. 49-72.
V. Lyubashevsky et al., "On ideal lattices and learning with errors over rings," Journal of the ACM, 2013, vol. 60 (6), pp. 1-23.
Vadim Lyubashevsky et al., "A Toolkit for Ring-LWE Cryptography," Springer, 2013, pp. 35-64.
L. Botros et al., "Memory-efficient high-speed implementation of Kyber on Cortex-M4," Springer, 2019, pp. 209-228.
H. M. Steffen et al., "In-depth Analysis of Side-Channel Countermeasures for CRYSTALS-Kyber Message Encoding on ARM Cortex-M4," Cryptology ePrint Archive, 2021, pp. 1-20.
D. T. Nguyen et al., "Optimized software implementations of CRYSTALS-Kyber, NTRU, and Saber using NEON-based spe- cial instructions of ARMv8," NIST, 2021, pp. 1-24.
M. Bisheh-Niasar et al., "Instruction-Set Accelerated Implementation of CRYSTALS- Kyber," IEEE, 2021, vol. 68 (11). pp. 4648-4659.
V. B. Dang et al., "High-Speed Hardware Ar-chitectures and FPGA Benchmarking of CRYSTALS-Kyber, NTRU, and Saber," Cryptology ePrint Archive, 2021, pp. 206-320.
A. Jati et al.. "A Configurable CRYSTALS-Kyber Hardware Implementation with Side-Channel Protection," Cryptology ePrint Archive, 2021, pp. 1-23.
K. Basu et al., "NIST Post-Quantum Cryptography—A Hardware Evaluation Study," Cryptology ePrint Archive, 2019, pp. 1-16.
U. Banerjee et al., "Sapphire: A Configurable Crypto-Processor for Post-Quantum Lattice-based Protocols," IACR Transactions on Cryptographic Hardware and Em-bedded Systems, 2019, vol. 2019 (4), pp. 17-61.
Utsav Banerjee et al., "Sapphire: A configurable crypto-processor for post-quantum lattice-based protocols (extended version)," Cryptology ePrint Archive, 2019, pp. 1-56.
E. Alkim et al., "ISA extensions for finite field arithmetic: Accelerating Kyber and NewHope on RISC-V," IACR Transactions on Cryptographic Hardware and Embedded Systems, 2020, vol. 2020 (3), pp. 219-242.
T. Fritzmann et al., "RISQ-V: Tightly coupled RISC-V accelerators for post-quantum cryptography," IACR Trans-actions on Cryptographic Hardware and Embedded Systems, 2020, vol. 2020 (4), pp. 239-280.
D.-e.-S. Kundi et al., "Ultra High-Speed Polynomial Multiplications for Lattice- based Cryptography on FPGAs," IEEE, 2022, vol. 10 (4), pp. 1993-2005.
C. Zhang et al., "Towards Efficient Hardware Implementation of NTT for kyber on FPGAs," IEEE, 2021, pp. 1-5.
F. Yarman et al., "A Hardware Accelerator for Polynomial Multiplication Operation of CRYSTALS- Kyber PQC Scheme," IEEE, 2021, pp. 1020-1025.
Z. Chen et al., "High-Performance Area-Efficient Polynomial Ring Processor for CRYSTALS-Kyber on FPGAs," Integration, 2021, vol. 78, pp. 25-35.
M. Bisheh-Niasar et al., "High-Speed NTT-based Polynomial Multiplication Accelerator for Post-Quantum Cryptography," IEEE, 2021, pp. 94-101.
A. Al Badawi et al., "Efficient Poly-nomial Multiplication via Modified Discrete Galois Transform and Negacyclic Convolution," Springer, 2018, pp. 666-682.
A. Langlois et al., "Worst-case to average-case reductions for module lattices," Springer, 2015, vol. 75 (3), pp. 565-599.
E. Fujisaki et al., "Secure Integration of Asymmetric and Symmetric Encryption Schemes," Springer, 1999, pp. 537-554.
H. J. Nussbaumer, "Fast Fourier Transform and Convolution Algorithms," Springer, 1982, vol. 2, pp. 106-107.
V. Lyubashevsky et al., "NTTRU: truly fast NTRU using NTT," IACR Transactions on Cryptographic Hardware and Embedded Systems, 2019, vol. 2019 (3), pp. 1-22.
E. Chu et al., "Inside the FFT black box: serial and parallel fast Fourier transform algorithms," CRC press, 1999, pp. 1-14.
W. M. Gentleman et al., "Fast Fourier transforms: for fun and profit," fall joint computer conference, 1966, pp. 563-578.
M. Garrido et al., "Hardware architectures for the fast Fourier transform," Springer, 2018, pp. 613-647.
H. Hsing, "SHA3 Core", OpenCores, 2013, pp. 1-13.
A. Karmakar et al., "Saber on ARM CCA-secure module lattice-based key encapsulation on ARM," Cryptology oPrint Archive, 2018, pp. 1-24.

* cited by examiner

Table I: Mathematical Notations

| Notation | Definition |
|---|---|
| Regular lower-case letter ($a$) | Element in $\mathbb{Z}_q$ |
| Lower-case letter with bar ($\bar{a}$) | Element in $GF(q^2)$ |
| Upper-case letter ($A/\hat{A}$) | Polynomial in $\mathbb{Z}_q$ in normal/transform domain |
| Upper-case letter with bar ($\bar{A}/\hat{\bar{A}}$) | Polynomial in $GF(q^2)$ in normal/transform domain |
| Bold lower-case letter ($\mathbf{a}/\hat{\mathbf{a}}$) | Polynomial vector in normal/transform domain |
| Bold upper-case letter ($\mathbf{A}/\hat{\mathbf{A}}$) | Polynomial matrix in normal/transform domain |
| Sans-serif upper-case letter (NTT) | Help function |
| $A_i$ | The $i$-th entity in $A$ |
| $\mathbf{a}^T/\mathbf{A}^T$ | Transpose of vector/matrix |
| $A \circ B / \mathbf{a} \circ \mathbf{b} / \mathbf{a} \circ \mathbf{B}$ | Component-wise multiplication |

Table II: Parameter sets for CRYSTALS-KyberKEM in the Third Round Submission

| Algorithm | NIST Level | Parameter set | | | | |
|---|---|---|---|---|---|---|
| | | $n$ | $k$ | $q$ | $(\eta_1, \eta_2)$ | $(d_u, d_v)$ |
| Kyber-512-CCA | 1 | 256 | 2 | 3,329 | (3,2) | (10,4) |
| Kyber-768-CCA | 3 | 256 | 3 | 3,329 | (2,2) | (10,4) |
| Kyber-1024-CCA | 5 | 256 | 4 | 3,329 | (2,2) | (11,5) |

FIG. 1

Algorithm 1 Iterative Split-Radix DIT DGT Algorithm without Pre-processing

Input: Given the parameter set $n, q, m = n/2, \zeta_m \in \mathbb{Z}_q[z]/(z^2+1)$. Let $\vec{A}$ be a folded vector of length $m$ composed of the original polynomial (of length $n$) coefficients. Elements of $\vec{A} = (\vec{A}_0, \vec{A}_1, \ldots, \vec{A}_{m-1})$.

Output: $\vec{\hat{A}} = \text{DGT}_m(\vec{A}) = (\hat{A}_0, \hat{A}_1, \ldots, \hat{A}_{m-1})$.

1: $\vec{\hat{A}} := \vec{A}$
2: $SEQ := 0$ ▷ $SEQ$ could be pre-computed
3: for $i = 0$ to $log_2 m - 1$ do
4:    $SEQ := SEQ + (-1)^i (2^{2^{log_2 m - i - 2}} - 1)$
5: end for
6: for $s = 0$ to $log_2 m - 1$ do
7:    $l := 2^s$
8:    $d := m/(2l)$
9:    for $i = 0$ to $l - 1$ do
10:      $TW_1 := \zeta_m^{ibs_{log_2 m}(2^{log_2 m - s} i + 1)\frac{d}{2}}$
11:      $TW_2 := \zeta_m^{ibs_{log_2 m}(2^{log_2 m - s} i + 1)\frac{3d}{2}}$
12:      for $j = 0$ to $d - 1$ do
13:         if $SEQ_{[(d-j) \ll s]} = 1$ then
14:            ▷ Check the $((d - j) \ll s)$-th bit of $SEQ$
15:            $u := (TW_1)\hat{A}_{2id+j}$
16:            $t := (TW_2)\hat{A}_{2id+j+d}$ ▷ DGT 1
17:         else if $s = 0$ then
18:            $u := \hat{A}_{2id+j}$
19:            $t := (\zeta_m^{m/2})\hat{A}_{2id+j+d}$ ▷ DGT 0-1
20:         else if $i \bmod 2 = 1$ then
21:            $u := \hat{A}_{2id+j}$
22:            $t := (-z)\hat{A}_{2id+j+d}$ ▷ DGT 0-2
23:         else
24:            $u := \hat{A}_{2id+j}$
25:            $t := \hat{A}_{2id+j+d}$ ▷ DGT 0-3
26:         end if
27:         $\hat{A}_{2id+j} := u + t; \hat{A}_{2id+j+d} := u - t$
28:      end for
29:    end for
30: end for
31: $\vec{\hat{A}} := \text{scramble}_{log_2 m}(\vec{\hat{A}})$
32: return $\vec{\hat{A}}$

FIG. 3

Algorithm 2 Iterative Split-Radix DIF IDGT Algorithm without Post-processing

Input: Given the parameter set $n, q, m = n/2, \zeta_m \in \mathbb{Z}_q[z]/(z^2+1)$. Let $\vec{A}$ be a folded vector of length $m$ composed of the original polynomial (of length $n$) coefficients. Elements of $\vec{A} = (\vec{A}_0, \vec{A}_1, ..., \vec{A}_{m-1})$.

Output: $\vec{A} = \text{IDGT}_m(\vec{A}) = (\vec{A}_0, \vec{A}_1, ..., \vec{A}_{m-1})$.

1: $\vec{A} := \text{scramble}_{\log_2 m}(\vec{A})$
2: $SEQ := 0$ ▷ $SEQ$ could be pre-computed
3: for $i = 0$ to $\log_2 m - 1$ do
4: $\quad SEQ := SEQ + (-1)^i (2^{2^{\log_2 m - i - 2}} - 1)$
5: end for
6: for $s = \log_2 m - 1$ to $0$ do
7: $\quad l := 2^s$
8: $\quad d := m/(2l)$
9: $\quad$ for $i = 0$ to $d - 1$ do
10: $\quad\quad$ for $j = i$ to $m - 1$ step $2d$ do
11: $\quad\quad\quad TW_1 := \zeta_m^{(-1)[4\mathrm{br}_{\log_2 n}(j 2^{\log_2 m - 1 - s}/d) + 1] \frac{d}{2}}$
12: $\quad\quad\quad TW_2 := \zeta_m^{(-1)[4\mathrm{br}_{\log_2 n}(j 2^{\log_2 m - 1 - s}/d) + 1] \frac{3d}{2}}$
13: $\quad\quad\quad$ if $SEQ_{[(d-j) \ll s]} = 0$ then
14: $\quad\quad\quad\quad$ ▷ Check the $((d-j) \ll s)$-th bit of $SEQ$
15: $\quad\quad\quad\quad u := \vec{A}_j + \vec{A}_{j+d}$
16: $\quad\quad\quad\quad t := \vec{A}_j - \vec{A}_{j+d}$
17: $\quad\quad\quad\quad$ if $s = 0$ then ▷ IDGT 0-2
18: $\quad\quad\quad\quad\quad \vec{A}_j := \frac{u}{2}; \vec{A}_{j+d} := \zeta_m^{m/2} \cdot \frac{t}{2}$
19: $\quad\quad\quad\quad$ else ▷ IDGT 0-1
20: $\quad\quad\quad\quad\quad \vec{A}_j := \frac{u}{2}; \vec{A}_{j+d} := \frac{t}{2}$
21: $\quad\quad\quad\quad$ end if
22: $\quad\quad\quad$ else ▷ IDGT 1
23: $\quad\quad\quad\quad u := \vec{A}_j + (-z) \cdot \vec{A}_{j+d}$
24: $\quad\quad\quad\quad t := \vec{A}_j - (-z) \cdot \vec{A}_{j+d}$
25: $\quad\quad\quad\quad \vec{A}_j := TW_1 \cdot \frac{u}{2}; \vec{A}_{j+d} := TW_2 \cdot \frac{t}{2}$
26: $\quad\quad\quad$ end if
27: $\quad\quad$ end for
28: $\quad$ end for
29: end for
30: return $\vec{A}$

FIG. 4

TABLE III: The comparison on the number of modular operations among low complexity NTT/INTT, classic DGT/IDGT, and the split-radix DGT/IDGT for given problem size n.

| n | Relative # of Modular Addition | | | Relative # of Modular Multiplication | | |
|---|---|---|---|---|---|---|
| | LC NTT/INTT[1] | DGT/IDGT[2] | SRDGT/SRIDGT[3] | LC NTT/INTT[1] | DGT/IDGT[2] | SRDGT/SRIDGT[3] |
| 128 | 0.62/0.74 | 1.42/1.64 | 1.00/1.02 | 1.11/1.11 | 1.90/2.37 | 1.00/1.00 |
| 256 | 0.61/0.72 | 1.39/1.58 | 1.00/1.02 | 1.09/1.09 | 1.84/2.25 | 1.00/1.00 |
| 512 | 0.60/0.72 | 1.37/1.54 | 1.00/1.02 | 1.08/1.08 | 1.80/2.16 | 1.00/1.00 |
| 1024 | 0.59/0.71 | 1.36/1.50 | 1.00/1.02 | 1.07/1.07 | 1.77/2.09 | 1.00/1.00 |

[1] LC NTT/INTT represents the low complexity NTT/INTT
[2] DGT/IDGT represents the classic DGT/IDGT
[3] SRDGT/SRIDGT represents the split-radix DGT/IDGT proposed in this work.
[4] In the LC INTT and the SRIDGT, the half operations would be introduced to avoid post processing. Such half operation could be preformed by a modular addition and an bit shift, which would be expected to increase 1.25 or 0.44 modular addition to each LC INTT butterfly operation or SRIDGT butterfly operation, respectively. The modular addition caused by half operations are included in the Table above.

FIG. 5

Table IV: Nine modes for the proposed unified BFU with the setup signal "sel", in which symbol "+" denotes corresponding operator is in use, while "−" denotes it is idle at the moment.

| Mode | sel[5:0] | Mul 0 | Mul 1 | Rotator |
|---|---|---|---|---|
| DGT 0-1 | 101010 | − | + | − |
| DGT 0-2 | 100010 | − | − | − |
| DGT 0-3 | 100000 | − | − | + |
| DGT 1 | 101110 | + | + | − |
| IDGT 0-1 | 001011 | + | + | − |
| IDGT 0-2 | 000011 | − | − | − |
| IDGT 1 | 001101 | + | + | + |
| PWM 0 | 001110 | + | + | − |
| PWM 1 | 011110 | + | + | − |

FIG. 7C

Table V: FPGA Implementation Result for the Proposed Split Radix DGT Core and Comparison with State-of-the-Art (n=256)

| Work | Method | BFU | Area #LUTs | #FFs | #DSPs | #BRAMs | Freq[MHz] | Cycles[CCs] NTT | INTT | CWM | NTT/CWM ATP ratio[§] LUT | BRAM | DSP |
|---|---|---|---|---|---|---|---|---|---|---|---|---|---|
| [13][C] | SW | - | - | - | - | - | 100 | 7725 | 9347 | 27873 | -/- | -/- | -/- |
| [22][Z] | HW/SW | - | - | - | - | - | 59 | 6868 | 6367 | 2395 | -/- | -/- | -/- |
| [21][A] | HW/SW | - | 2983 | 0 | 0 | 11 | 25 | 1289 | - | - | 59.7/- | 78.4/- | 0.0/- |
| [23][Z] | HW/SW | 2 | 2908 | 170 | 9 | 0 | - | 1935 | 1930 | - | -/- | -/- | -/- |
| [18][†,A] | HW | 2 | 230 | 175 | 0 | 1 | 312 | 570 | 570 | - | 0.2/- | 0.3/- | 0.0/- |
| [28][†,A] | HW | 2×2 | 801 | 717 | 4 | 2 | 222 | 324 | 324 | - | 0.5/- | 0.4/- | 0.6/- |
| [27][†,A] | HW | 1 | 479 | 472 | 1 | 2 | 246 | 4108 | - | - | 3.1/- | 4.6/- | 1.7/- |
| [25][†,A] | HW | 2 | 609 | 640 | 2 | 4 | 257 | 490 | 490 | - | 0.5/- | 1.1/- | 0.4/- |
| [16][A] | HW | 1 | 360 | 145 | 3 | 2 | 115 | 940 | 1203 | 1289 | 1.1/4.6 | 2.3/9.0 | 2.5/10.1 |
| [16][A] | HW | 2 | 737 | 290 | 6 | 4 | 115 | 474 | 602 | 1289 | 1.2/9.3 | 2.3/18.0 | 2.6/20.3 |
| [9][A] | HW | 2 | 1737 | 1167 | 2 | 3 | 161 | 512 | 576 | 256 | 2.1/3.1 | 1.3/1.9 | 0.7/1.0 |
| [26][A] | HW | 1 | 948 | 325 | 1 | 2.5 | 190 | 904 | 904 | 647 | 1.8/3.6 | 1.6/3.4 | 0.5/1.0 |
| [26][A] | HW | 4 | 2543 | 792 | 4 | 9 | 182 | 232 | 233 | 167 | 1.3/2.6 | 1.6/3.3 | 0.5/1.1 |
| [26][A] | HW | 16 | 9508 | 2684 | 16 | 35 | 172 | 69 | 71 | 47 | 1.5/2.9 | 1.9/3.8 | 0.7/1.3 |
| This work(k=1)[A] | HW | 1 | 1603 | 2004 | 6 | 4.5 | 239 | 384 | 384 | 132 | 1.0/1.0 | 1.0/1.0 | 1.0/1.0 |

[†] Do not support component-wise multiplication (CWM).
[C] Implemented on Cortex-M4 platform.
[Z] Implemented on Zynq-7000 FPGA platform.
[A] Implemented on Artix-7 FPGA platform.
[§] NTT ATP ratio is the normalized product of FPGA resources and the NTT total time, and CWM ATP ratio is the normalized product of FPGA resources and the CWM total time, by setting this work as baseline.

FIG. 12

Table VI: FPGA Implementation Result for the Proposed KyberKEM-Split Radix DGT and Comparison with State-of-the-Art.

| Work | Method | Platform | Area | | | | | Freq [MHz] | Cycles[KCCs] | | | Total time [μs] | Total cycle ratio | ATP ratio[†] | | |
|---|---|---|---|---|---|---|---|---|---|---|---|---|---|---|---|---|
| | | | #LUTs | #FFs | #DSPs | #BRAMs | | | KG | Enc | Dec | | | LUT | BRAM | DSP |
| Kyber-512-CCA | | | | | | | | | | | | | | | | |
| [13] | SW | Cortex-M4 | - | - | - | - | 24 | 499 | 634 | 597 | 72083.3 | 227.6 | - | - | - |
| [22] | HW/SW | Artix-7 | 2K | 2K | 5 | 34 | 59 | 710 | 971 | 870 | 43237.3 | 335.7 | 201.0 | 4577.8 | 304.9 |
| [21] | HW/SW | Artix-7 | 15K | 3K | 11 | 14 | 25 | 75 | 132 | 142 | 13960.0 | 45.9 | 485.9 | 606.6 | 358.6 |
| [23] | HW/SW | Zynq-7000 | 24K | 11K | 21 | 32 | - | 150 | 193 | 205 | - | 72.1 | - | - | - |
| [16] | HW | Artix-7 | 16K | 5K | 6 | 15 | 115 | 4 | 7 | 10 | 182.6 | 2.8 | 7.6 | 8.5 | 2.6 |
| [17] | HW | Artix-7 | 9K | 9K | 4 | 4.5 | 220 | 2.2 | 3.2 | 4.5 | 45.2 | 1.3 | 1.0 | 0.6 | 0.4 |
| [9] - server | HW | Artix-7 | 7K | 5K | 2 | 3 | 161 | 3.8 | 5 | 6.7 | 96.9 | 2.1 | 1.7 | 0.9 | 0.5 |
| This work | HW | Artix-7 | 12K | 14K | 12 | 9 | 213 | 1.7 | 2.4 | 3.5 | 35.7 | 1.0 | 1.0 | 1.0 | 1.0 |
| Kyber-768-CCA | | | | | | | | | | | | | | | | |
| [13] | SW | Cortex-M4 | - | - | - | - | 24 | 947 | 1113 | 1059 | 129958.3 | 311.9 | - | - | - |
| [21] | HW/SW | Artix-7 | 15K | 3K | 11 | 14 | 25 | 112 | 178 | 191 | 19240.0 | 48.1 | 429.4 | 435.1 | 246.9 |
| [23] | HW/SW | Zynq-7000 | 24K | 11K | 21 | 32 | - | 273 | 326 | 340 | - | 93.9 | - | - | - |
| [16] | HW | Artix-7 | 16K | 6K | 9 | 16 | 115 | 7 | 10 | 14 | 269.6 | 3.1 | 6.4 | 7.0 | 2.8 |
| [17] | HW | Artix-7 | 11K | 10K | 6 | 6.5 | 220 | 2.6 | 3.7 | 4.9 | 51.3 | 1.1 | 0.8 | 0.5 | 0.4 |
| [9] - server | HW | Artix-7 | 7K | 5K | 2 | 3 | 161 | 6.3 | 7.9 | 10 | 150.4 | 2.4 | 1.7 | 0.7 | 0.4 |
| This work | HW | Artix-7 | 14K | 17K | 18 | 13 | 210 | 2.1 | 3.4 | 4.5 | 47.6 | 1.0 | 1.0 | 1.0 | 1.0 |
| Kyber-1024-CCA | | | | | | | | | | | | | | | | |
| [13] | SW | Cortex-M4 | - | - | - | - | 24 | 1525 | 1732 | 1653 | 204583.3 | 350.7 | - | - | - |
| [22] | HW/SW | Artix-7 | 2K | 2K | 5 | 34 | 59 | 2203 | 2619 | 2429 | 122898.3 | 517.9 | 227.9 | 4059.2 | 373.1 |
| [21] | HW/SW | Artix-7 | 15K | 3K | 11 | 14 | 25 | 149 | 223 | 241 | 24520.0 | 43.8 | 340.5 | 333.5 | 163.8 |
| [23] | HW/SW | Zynq-7000 | 24K | 11K | 21 | 32 | NA | 350 | 405 | 425 | - | 84.3 | - | - | - |
| [16] | HW | Artix-7 | 16K | 6K | 12 | 17 | 112 | 10 | 14 | 18 | 375.0 | 3.0 | 5.6 | 6.2 | 2.7 |
| [17] | HW | Artix-7 | 12K | 11K | 8 | 8.5 | 220 | 3.6 | 4.8 | 5.8 | 64.6 | 1.0 | 0.7 | 0.5 | 0.3 |
| [18] - RB | HW | Artix-7 | 7K | 4K | 2 | 5.5 | 256 | 42.8 | 48.8 | 57.2 | 580.6 | 10.7 | 3.8 | 3.1 | 0.7 |
| [18] - CB | HW | Artix-7 | 5K | 2K | 2 | 6.5 | 250 | 1148 | 1236 | 1172 | 14224.0 | 254.0 | 69.5 | 89.8 | 17.3 |
| [9] - server | HW | Artix-7 | 7K | 5K | 2 | 3 | 161 | 9.4 | 11.3 | 13.9 | 214.9 | 2.5 | 1.5 | 0.6 | 0.3 |
| This work | HW | Artix-7 | 16K | 19K | 24 | 15 | 204 | 3.9 | 4.5 | 5.6 | 68.6 | 1.0 | 1.0 | 1.0 | 1.0 |

[†] ATP ratio is the normalized product of FPGA resources and the total time by setting this work as baseline.

FIG. 13

CRYPTOSYSTEM WITH UTILIZING SPLIT-RADIX DISCRETE GALOIS TRANSFORMATION

TECHNICAL FIELD

The present invention generally relates to cryptography techniques; more specifically, the present invention relates to a cryptosystem processor with utilizing split-radix Discrete Galois Transformation (DGT).

BACKGROUND

The rapid development of quantum computers and quantum algorithms such as Shor's algorithm threatens the security basis of conventional public-key cryptosystems such as RSA and ECC. The urgent need to replace the conventional public-key cryptosystem with quantum-resistant cryptography, or the so-called post-quantum cryptography (PQC), drives the attention of researchers and standards organizations. In July 2020, the round 3 candidates of the NIST PQC competition were announced, and four public-key algorithms were disclosed as the finalists. The finalists include three lattice-based cryptography (i.e., CRYSTALS-KyberKEM, NTRU, SABER), and one code-based cryptography (i.e., Classic McEliece). As stated by the NIST, the PQC competition can evaluate the submissions by different criteria, including security, cost, and algorithm & implementation characteristics.

To evaluate the PQC candidates on the criteria of cost, there have been lots of published articles comparing different implementations of candidates. Within the supplementary functions of the proposed PQC schemes, the most time-consuming parts are the polynomial multiplication and the hash functions. The recent hardware and software/hardware co-design works offload the polynomial multiplication and the hash functions to dedicated hardware accelerators.

The polynomial multiplication is computationally intensive. Recent solutions to polynomial multiplication can be in quasi-linear time O (n log n) using the number-theoretic transforms (NTTs) when we treat the polynomial multiplication as a discrete convolution problem. It is remarkable that the polynomial multiplication over different polynomial rings should be treated carefully. For instance, the polynomial multiplication over $\mathbb{Z}_q[x]/\langle x^n+1 \rangle$ can be treated as negative wrapped convolution between the vectors of the coefficients of input polynomials. The polynomials ring $\mathbb{Z}_q[x]/\langle x^n+1 \rangle$ are widely used in many lattice-based cryptography algorithms because of the high computing efficiency. For instance, the cryptosystems CRYSTALS-KyberKEM, SABER, and Luybashevsky's public-key cryptosystem employ the aforementioned polynomial rings in their cryptography algorithm.

In this regard, the further related works are provided as follows. KyberKEM is one of the final round key encapsulation mechanisms in the NIST post-quantum cryptography competition. NTT, as the computing bottleneck of KyberKEM, has been widely studied.

There are several works concerning the implementation of Crystals-KyberKEM. Software implementation of KyberKEM has been studied. One of the related works proposed a memory-efficient high-speed optimization of KyberKEM on ARM Cortex-M4 core. Furthermore, the side-channel defence of KyberKEM was treated, which is also based on ARM Cortex-M4 core. Likewise, one of the related works studied the software optimization of KyberKEM on a high-performance platform.

Pure hardware implementations of KyberKEM have been investigated. The related work is a compact hardware implementation of KyberKEM for the third round submission in NIST PQC competition on Xilinx Artix-7 FPGA platform. The related work proposed an implementation for both FPGA and ASIC design with an improvement in polynomial sampling cores. One of the related works proposed the high-performance implementation of KyberKEM, NTRU and Saber with a novel Polynomial Vector Multiplication Unit (PVMU) design. One of the related works concerns the side-channel protection for KyberKEM in pure hardware.

On the other hand, software/hardware co-design implementations of KyberKEM have been investigated. One of the related works proposed an ASIC crypto-processor based on RISC-V architecture supporting Crystals-KyberKEM, Crystals-Dilithium, FrodoKEM, NewHope, and qTesla for the second round submission in NIST PQC competition, which was extended to FPGA platform. The related work proposed the integration of instruction sets for finite field arithmetic operations in a RISC-V processor, supporting PQC algorithms including KyberKEM and NewHope. The related work integrated the vectorized modular arithmetic operations and NTT computation in a RISC-V processor and presents the ASIC and FPGA implementation result, supporting PQC algorithms including KyberKEM, Saber and NewHope.

The literature regarding improving the polynomial multiplication in hardware is also being discussed. Several works focusing on the implementation of the NTT computation have been investigated. One of the related works proposed a low-complexity NTT/INTT algorithm, absorbing the pre-process and post-process into NTT and INTT, respectively. In the related work, a parallel architecture is proposed for high-speed NTT design. Other related works proposed NTT-based polynomial multiplication architectures for KyberKEM on FPGA.

Currently, there are several challenges in the field of cryptography, particularly related to computing complexity. The aforementioned methods may not sufficiently reduce the computing complexity in a smooth manner, leading to difficulties in improving performance. Therefore, there is a need to develop robust transformation algorithms that can effectively address these challenges.

SUMMARY OF INVENTION

It is an objective of the present invention to provide an apparatus and a method to address the aforementioned shortcomings and unmet needs in the state of the art. In accordance with one aspect of the present invention, a cryptosystem processor for operating split-radix discrete Galois transformation/inverse discrete Galois transformation is provided. The cryptosystem processor includes a twiddle factor memory, at least one split radix discrete Galois transformation/inverse discrete Galois transformation butterfly unit (SRDGT BFU), and a stream permutation network (SPN). The twiddle factor memory is instantiated by dual-port read only memory (ROM) and has a first ZETA port and a second ZETA port. The at least one SRDGT BFU has six input ports and four output ports and switchable among operation in a discrete Galois transformation (DGT) mode, an inverse discrete Galois transformation (IDGT) mode, or a component-wise multiplication (CWM) code, in which two of the input ports electrically communicate with the first ZETA port and the second ZETA port, respectively.

The SRDGT BFU is configured to read and write two data points when working under the DGT or IDGT mode and is configured to read and write four data points when working under the CWM mode. The SPN electrically communicates with the SRDGT BFU and has a first dual-port block random access memory (BRAM), a second dual-port BRAM, and a third dual-port BRAM which serve as memory caches configured to store polynomial, wherein the SPN is configured to support the required number of data points reading or writing per cycle in the DGT mode, IDGT mode, or the CWM mode.

In accordance with another one aspect of the present invention, a split radix DGT apparatus is provided. The split radix DGT apparatus includes a cryptosystem processor, a RAM module, and an input/output part. The RAM module electrically communicates with the cryptosystem processor and is configured to store polynomials and to pass the polynomials into the cryptosystem processor. The input/output part is configured to work as an input/output buffer for the architecture of the split radix DGT apparatus.

By the configuration of the present invention, a novel DGT algorithm that leverages the split-radix method is provided. It is an objective to reduce computing complexity while maintaining the transform length. The algorithm achieves lower computing complexity without compromising the transform length, making it a more efficient alternative to existing NTT algorithms when implemented in software or hardware. Additionally, the configuration of the present invention ensures efficient processing through a fully-pipelined scheduling technique, facilitated by a dedicated stream permutation network. The applied approach of the present invention enables smooth data flow during the transformation process, enhancing overall performance.

To optimize hardware utilization, the configuration of the present invention introduces a compact and unified split-radix DGT processor. This processor shares multipliers among the nine working modes of the split-radix DGT algorithm, reducing hardware requirements and allowing for parameterization based on specific computing tasks. By integrating different operations and designing compact hardware modules, these processors streamline operations and enhance overall system efficiency. The combination of the split-radix DGT algorithm and the efficient processor design results in improved performance, resource optimization, and reduced hardware complexity.

BRIEF DESCRIPTION OF DRAWINGS

Embodiments of the invention are described in more details hereinafter with reference to the drawings, in which:

FIG. 1 shows Table I and Table II for illustrating mathematical notations and parameters according to one aspect of the present disclosure;

FIG. 3 shows Algorithm 1 for split-radix DGT according some embodiments of the present invention;

FIG. 4 shows Algorithm 2 for split-radix DGT according some embodiments of the present invention;

FIG. 5 shows Table III for illustrating comparison on the number of modular operations according to one aspect of the present disclosure;

FIG. 7C shows Table IV for illustrating nine modes for the SRDGT BFU according to one aspect of the present disclosure;

FIG. 12. shows Table V for illustrating an implementation result for the comparison; and FIG. 13 depicts Table VI for showing the hardware resource utilization and the latency of the hardware system according to one aspect of the present disclosure.

DETAILED DESCRIPTION OF THE INVENTION

Figure 2:
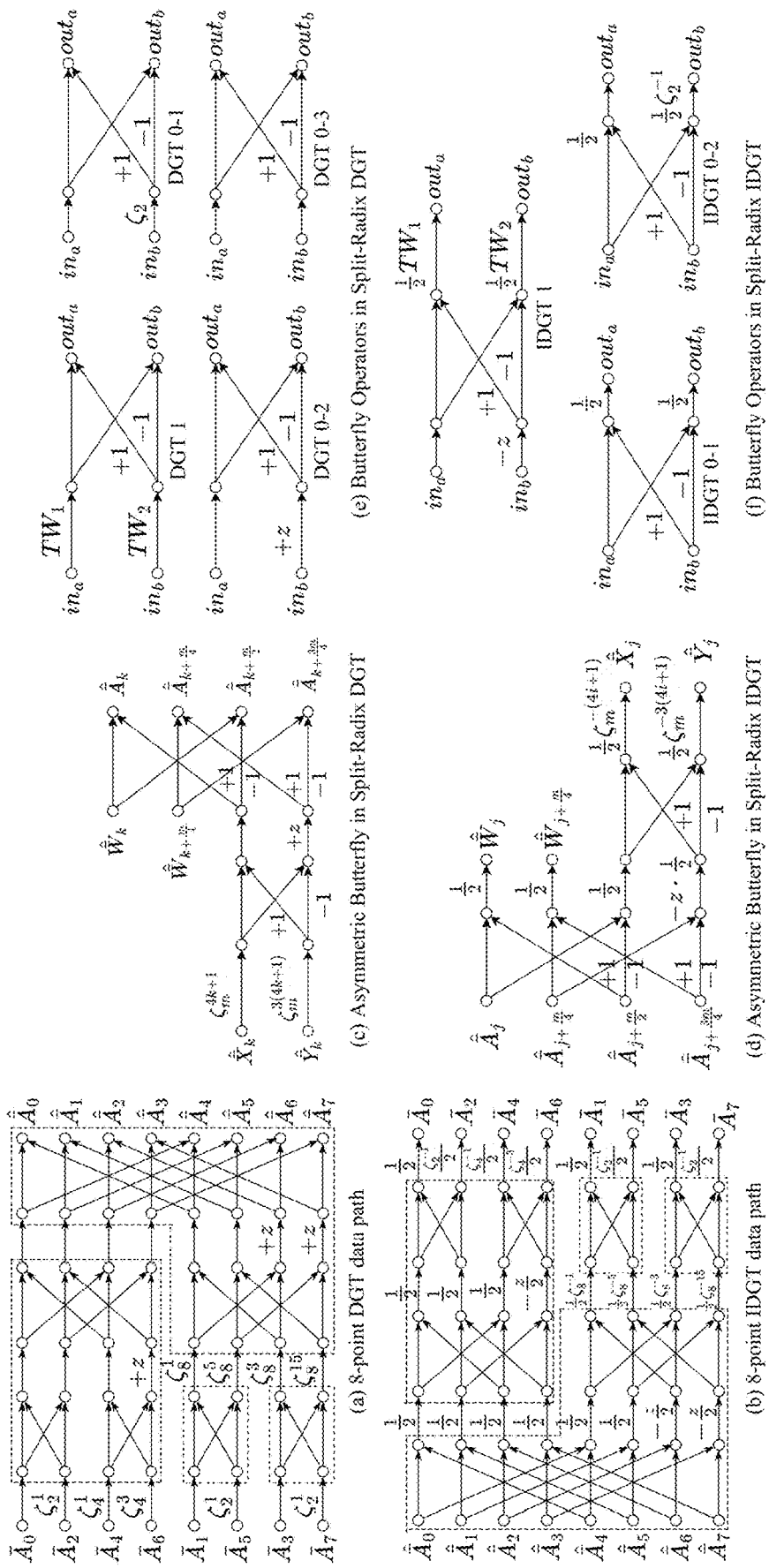
FIG. 2 shows the data flow and the butterfly of an 8-point split-radix DGT according some embodiments of the present invention.

In the following description, a cryptosystem with utilizing split-radix Discrete Galois Transformation (DGT) and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

To make the present invention understandable, notations and basic operations are stated before embodiments. FIG. 1 shows Table I and Table II for illustrating mathematical notations and parameters according to one aspect of the present disclosure.

Table I provides the mathematical notations used in the present disclosure. $\mathcal{R}_q$ is sued to denote the polynomial ring $\mathbb{Z}_q[x]/\langle x^n+1\rangle$ defined over the field $\mathbb{Z}_q$, where q is a prime integer.

CRYSTALS-KyberKEM is a key-encapsulation mechanism with Adaptive Chosen Ciphertext Attack (IND-CCA2) security. The security of KyberKEM is based on the hardness of the learning-with-errors problem in module lattices (i.e., MLWE problem). To construct an IND-CCA2-secure KEM, CRYSTALS-Kyber uses the slightly tweaked Fujisaki-Okamoto (FO) transform to transfer a Chosen Plaintext Attack (IND-CPA) secure Public-Key Encryption (PKE) scheme, which is called as CRYSTALS-KyberPKE. The parameter sets for CRYSTALS-KyberKEM is shown in Table II. The key generation, encryption, and decryption of the CRYSTALS-KyberPKE are defined as follows, with following the definition of the help functions CBD, Parse, Compress, NTT, and INTT in:

KeyGen(·): Key generation samples s and e from centered binomial distribution (CBD), and Â from uniform distribution (Parse). The public key pk=(ρ, t̂) and secret key sk=ŝ are returned where ρ is the random seed and t̂=Â∘ŝ+ê.

Enc(pk, M): Encryption samples r, $e_1$ and $E_2$ from CBD, and $\hat{A}$ from Parse. The ciphertext ct=(Compress(u), Compress(V)) is returned where u=INTT($\hat{A}^T \circ \hat{r}$)+$e_1$ and V=INTT($\hat{t}^T \circ \hat{r}$)+$E_2$+M.

Dec(sk,ct): Decryption returns the recovered message M=Compress(V−INTT($\hat{s}^T \circ \hat{u}$)) where u and V are decompressed from ct.

NTT and Inverse NTT (INTT):

NTT is a variant of Discrete Fourier Transform (DFT) by changing the complex number field into finite field $\mathbb{Z}_q$. Given a polynomial of length n, the length-n NTT (noted as $NTT_n$) is defined as $\hat{A}_j = NTT_n(A)_j = \Sigma_{i=0}^{n-1} A_i \omega_n^{ij}$ mod q, where $0 \le j < n$. $\omega_n$(mod q) denotes the primitive n-th root of unit over $\mathbb{Z}_q$ or twiddle factor of length-n NTT. $\omega_n$ (mod q) exists when $q \equiv 1$ (mod n).

The inverse NTT (INTT) can be performed by replacing the twiddle factor of length-n NTT $\omega_n$ (mod q) by $\omega_n^{-1}$ (mod q), and multiplying the scalar factor $n^{-1}$ (mod q) after the summation. The length-n INTT(noted as $INTT_n$) is defined as $A_i = INTT_n(\hat{A})_i = n^{-1} \Sigma_{j=0}^{n-1} \hat{A}_j \omega_n^{-ij}$ mod q, where $0 \le i < m$.

Polynomial Multiplication Via NTT:

According to fast Fourier transform and convolution algorithms, polynomial multiplication over $\mathcal{R}_q$ can be solved efficiently by negative wrapped convolution (NWC) when the prime parameter q satisfies 2n|(q−1). NWC can introduce pre-processing before NTT and post-processing after INTT. In order to reduce the computing complexity of NWC, a related work proposed low-complexity NTT and INTT algorithms (noted as LC NTT/INTT) by merging the pre and post processing into NTT and INTT without additional modular multiplication. Based on the related work, the number of modular multiplications in the LC NTT/INTT algorithms is $$\frac{n}{2} \log_2 n.$$

Starting from the second-round submission of Crystals-KyberKEM, the parameter set (n,q) is selected as (256,3329) as shown in Table II. Given that n|(q−1) but 2n∤(q−1), the aforementioned NWC via NTT cannot be applied directly. A variant of NTT proposed can be adopted to apply the NWC in Crystals-Kyber KEM. Such a variant is based on the observation that, when polynomial F is factored into a product F=GH over the finite field $\mathbb{Z}_q$, an isomorphism by the Chinese remainder theorem is provided:

$$\mathbb{Z}_q[x]/(F) \cong \mathbb{Z}_q[x]/(G) \times \mathbb{Z}_q[x]/(H).$$

Since $x^{256}+1 = \Pi_{i=0}^{127}(x^2 - \omega_{256}^{2i+1})$ gives the primitive 256-th roots of unity $\omega_{256}$, the definition of NTT working on $\mathbb{Z}_{3329}[x]/\langle x^{256}+1 \rangle$ (noted as $NTT_{256}^{3329}$) is given by:

$$NTT_{256}^{3329}(A)_i = A(x) \mod (x^2 - \omega_{256}^{2i+1})$$
$$= x \sum_{j=0}^{127} A_{2j+1} \omega_{256}^{(2i+1)j} + \sum_{j=0}^{127} A_{2j} \omega_{256}^{(2i+1)j}$$
$$= x \hat{A}_{2i+1} + \hat{A}_{2i},$$

where $0 \le i < 128$ and $\hat{A}_{2i+1} = \Sigma_{j=0}^{127} A_{2j+1} \omega_{256}^{(2i+1)j}$, and $\hat{A}_{2i} = \Sigma_{j=0}^{127} A_{2j} \omega_{256}^{(2i+1)j}$. Now both $\hat{A}_{2i+1}$ and $\hat{A}_{2i}$ can get solved by the length-128 low-complexity NTT. As for the inverse transform, two length-128 low-complexity INTTs can be used to reconstruct A(x) from $\hat{A}_{2i+1}$ and $\hat{A}_{2i}$. The NWC working on $\mathbb{Z}_{3329}[x]/\langle x^{256}+1 \rangle$ can also get solved as:

$$INTT_{256}^{3329}(NTT_{256}^{3329}(a) \circ NTT_{256}^{3329}(b)).$$

Such component-wise multiplication is defined as:

$$A(x) \circ B(x) \mod (x^2 - \omega_{256}^{2i+1}) = (x\hat{A}_{2i+1} + \hat{A}_{2i})(x\hat{B}_{2i+1} + \hat{B}_{2i}) \mod (x^2 - \omega_{256}^{2i+1}),$$

where $0 \le i < 128$. Thus, polynomial multiplication over $\mathbb{Z}_{3329}[x]/\langle x^{256}+1 \rangle$ is performed by four length-128 low-complexity NTTs, one length-128 component-wise multiplication, and two length-128 low-complexity INTTs.

Negative Wrapped Convolution Via DGT:

Consider $A(x) \in \mathcal{R}_q$. Let $$m = \frac{n}{2}$$

and $z=x^m=\sqrt{x^n} \equiv \sqrt{-1} \pmod{q}$. Then, A(x) is rewritten as:

$$A(x) = A_{n-1}x^{n-1} + A_{n-2}x^{n-2} + \cdots + A_1 x^1 + A_0 \quad \text{(Eq. 0)}$$
$$= (A_{n-1}x^m + A_{m-1})x^{m-1} + \cdots + (A_m x^m + A_0)$$
$$= (A_{n-1}z + A_{m-1})x^{m-1} + \cdots + (A_m z + A_0)$$
$$= \bar{A}_{m-1}x^{m-1} + \cdots + \bar{A}_1 x^1 + \bar{A}_0,$$

where $\bar{A}_i = (A_{i+m}z + A_i)$, $0 \le i < m$. It is notable that the $\bar{A}_i \in \mathbb{Z}_q[z]/\langle z^2+1 \rangle$, which is isomorphic to $GF(q^2)$. Given $0 \le i, j < m$, some arithmetic operations over $\mathbb{Z}_q[z]/\langle z^2+1 \rangle$ are defined as:

Addition: $\bar{A}_i + \bar{A}_j = (A_{i+m} + A_{j+m})z + (A_i + A_j);$ (Eq. 1)

Multiplication: $\bar{A}_i \circ \bar{A}_j = (A_i A_j - A_{i+m} A_{j+m})z + (A_i A_{j+m} + A_{i+m} A_j).$ The $\zeta_m \in \mathbb{Z}_q[z]/\langle z^2+1 \rangle$ can be defined, such that $\zeta_m^m = z$. Such $\zeta_m$ exists when 4m|(q−1). It is observed that $\{\zeta_m^{4i+1}, \forall 0 \le i < m\}$ is a set of solutions of the equation $x^m = z$ on $\mathbb{Z}_q[z]/\langle z^2+1 \rangle$, indicating $\{\zeta_m^{4i+1}, \forall 0 \le i < m\}$ fulfills the following properties:

Symmetry: $\zeta_m^{4(i+\frac{m}{2})+1} = \zeta_m^{4i+1} \zeta_m^{2m} = (-1)\zeta_m^{4i+1};$ Periodicity: $\zeta_m^{4(i+m)+1} = \zeta_m^{4i+1} \zeta_m^{4m} = \zeta_m^{4i+1};$ Scalability: $\zeta_{m/k}^{4(i/k)+1} = \zeta_{m/k}^{4(i/k)} \zeta_{m/k}^1 = \zeta_m^{4i+k};$ Semi-symmetry: $\zeta_m^{4(i+\frac{m}{4})+1} = \zeta_m^{4i+1} \zeta_m^m = \zeta_m^{4i+1} z;$ where k is a power-of-two integer that is smaller than m. Thus, the set of twiddle factors in Discrete Galois Transform (DGT) is defined as $\{\zeta_m^{4i+1}, \forall 0 \le i < m\}$. For a length-m polynomial $\bar{A}$, whose entities $\bar{A}_i \in \mathbb{Z}_q[z]/\langle z^2+1 \rangle$, the definition of length-m DGT (noted as $DGT_m$) can be $\tilde{A}_j = DGT_m(\bar{A})_j = \Sigma_{i=0}^{m-1} (\bar{A}_i \zeta_m^i) \zeta_m^{4ji}$, where $0 \le j < m$. Similarly, the definition of length-m IDGT (noted as $IDGT_m$) can be $IDGT_m(\tilde{A})_i = m^{-1} \zeta_m^{-i} \Sigma_{j=0}^{m-1} (\tilde{A}_j \zeta_m^{-4ji})$, where $0 \le i < m$. According to a related work, one can perform the $DGT_m$ and $IDGT_m$ algorithms similar to the classic NTT and INTT, by replacing the arithmetic operations in $\mathbb{Z}_q$ with arithmetic operations in $\mathbb{Z}_q[z]/\langle z^2+1\rangle$ defined in (Eq. 1), which means $$\frac{m}{2}\log_2 m + m \text{ and } \frac{m}{2}\log_2 m + 2m$$

multiplications in $\mathbb{Z}_q[z]/\langle z^2+1\rangle$ are needed in $DGT_m$ and $IDGT_m$, respectively. Recall that the addition in $\mathbb{Z}_q[z]/\langle z^2+1\rangle$ involves no modular multiplication while each multiplication in $\mathbb{Z}_q[z]/\langle z^2+1\rangle$ includes three modular multiplications using the Karatsuba method. The number of modular multiplication(s) in $DGT_m$ and $IDGT_m$ can be $$3\frac{m}{2}\log_2 m + 3m \text{ and } 3\frac{m}{2}\log_2 m + 6m,$$

respectively.

According to a related work, the length-n NWC can also be solved via DGT as:

$IDGT_m(DGT_m(\overline{A}) \circ DGT_m(\overline{B}))$, where $$m = \frac{n}{2}.$$

Thus, length-n NEW can be performed as two length-m DGTs after pre-processing, one length-m point-wise multiplication, and one length-m IDGT following by post-processing.

In the present invention, split-radix DGT and inverse Discrete Galois Transform (IDGT) is proposed to reduce the computing complexity. In the present disclosure, an approach is proposed to integrate the split radix and decimation-in-time (DIT) into the low-complexity DGT algorithm, while using split radix and decimation-in-frequency (DIF) to derive IDGT. These novel split-radix DGT/IDGT algorithms inherit the advantages of small multiplication number from split radix nature and the short transformation length from DGT/IDGT, which enable low complexity NWCs.

The Proposed Split Radix DGT:

The low-complexity DGT is derived in the split radix and decimation-in-time (DIT). Given a length-m polynomial $\overline{A}$, whose entities $\overline{A}_i \in \mathbb{Z}_q[z]/\langle z^2+1\rangle$. The derivation is started by splitting the summation of DGT into three groups according to the index of $\overline{A}$ as follows:

$$\hat{\overline{A}}_j = \sum_{i=0}^{\frac{m}{4}-1} \overline{A}_{4i+1}\left(\zeta_m^{4j+1}\right)^{4i+1} + \sum_{i=0}^{\frac{m}{2}-1} \overline{A}_{2i}\left(\zeta_m^{4j+1}\right)^{2i} + \sum_{i=0}^{\frac{m}{4}-1} \overline{A}_{4i+3}\left(\zeta_m^{4j+1}\right)^{4i+3} =$$

$$\zeta_m^{4j+1}\sum_{i=0}^{\frac{m}{4}-1} \overline{A}_{4i+1}\left(\zeta_{m/4}^{4j+1}\right)^{i} + \sum_{i=0}^{\frac{m}{2}-1} \overline{A}_{2i}\left(\zeta_{m/2}^{4j+1}\right)^{i} + \zeta_m^{3(4j+1)}\sum_{i=0}^{\frac{m}{4}-1} \overline{A}_{4i+1}\left(\zeta_{m/4}^{4j+1}\right)^{i},$$

where $0 \leq j < m$. The degree-m DGT can be decomposed into two degree-$\frac{m}{4}$ DGTs and one degree-$\frac{m}{2}$ DGT.

Namely, $$\sum_{i=0}^{\frac{m}{2}-1} \overline{A}_{2i}\left(\zeta_{m/2}^{4j+1}\right)^{i} \text{ as } \hat{\overline{W}}_j, \sum_{i=0}^{\frac{m}{4}-1} \overline{A}_{4i+1}\left(\zeta_{m/4}^{4j+1}\right)^{i}$$

is set as $\overline{X}_j$, and $$\sum_{i=0}^{\frac{m}{4}-1} \overline{A}_{4i+3}\left(\zeta_{m/4}^{4j+1}\right)^{i}$$

is set as $\overline{Y}$, then:

$$\hat{\overline{A}}_j = \hat{\overline{W}}_j + \zeta_m^{4j+1}\hat{\overline{X}}_j + \zeta_m^{3(4j+1)}\hat{\overline{Y}}_j \quad \text{(Eq. 2)}$$

For $$0 \leq j < \frac{m}{4},$$

(Eq. 2) is rewritten in terms of $\hat{\overline{W}}_j$, $$\hat{\overline{W}}_{j+\frac{m}{4}},$$

$\overline{X}_j$, and $\overline{Y}_j$ as:

$$\hat{\overline{A}}_j = \hat{\overline{W}}_j + \left(\zeta_m^{4j+1}\hat{\overline{X}}_j + \zeta_m^{3(4j+1)}\hat{\overline{Y}}_j\right), \quad \text{(Eq. 3A)}$$

$$\hat{\overline{A}}_{j+\frac{m}{4}} = \hat{\overline{W}}_{j+\frac{m}{4}} + z\left(\zeta_m^{4j+1}\hat{\overline{X}}_j - \zeta_m^{3(4j+1)}\hat{\overline{Y}}_j\right),$$

$$\hat{\overline{A}}_{j+\frac{m}{2}} = \hat{\overline{W}}_j - \left(\zeta_m^{4j+1}\hat{\overline{X}}_j + \zeta_m^{3(4j+1)}\hat{\overline{Y}}_j\right),$$

$$\hat{\overline{A}}_{j+\frac{3m}{4}} = \hat{\overline{W}}_{j+\frac{m}{4}} - z\left(\zeta_m^{4j+1}\hat{\overline{X}}_j - \zeta_m^{3(4j+1)}\hat{\overline{Y}}_j\right).$$

(Eq. 3A) represents the asymmetric DIT butterfly computation for split-radix DGT. It is noted there are two boundary cases at m=2 and m=4. When m=2, the DGT problem $\overline{A}_j$ can get solved as:

$$\hat{\overline{A}}_0 = \overline{A}_0 + \overline{A}_1\zeta_2, \quad \text{(Eq. 3B)}$$

$$\hat{\overline{A}}_1 = \overline{A}_0 + \overline{A}_1\zeta_2^5 = \overline{A}_0 - \hat{\overline{A}}_1\zeta_2.$$

And, when m=4, the DGT problem $\overline{A}_j$ is solved as:

$$\hat{\overline{A}}_0 = \left(\overline{A}_0 + \overline{A}_2\zeta_4^2\right) + \left(\overline{A}_1\zeta_4 + \overline{A}_3\zeta_4^3\right),$$

$$\hat{\overline{A}}_1 = \left(\overline{A}_0 - \overline{A}_2\zeta_4^2\right) + z\left(\overline{A}_1\zeta_4 - \overline{A}_3\zeta_4^3\right),$$

$$\hat{\overline{A}}_2 = \left(\overline{A}_0 + \overline{A}_2\zeta_4^2\right) - \left(\overline{A}_1\zeta_4 + \overline{A}_3\zeta_4^3\right),$$

$$\hat{\overline{A}}_3 = \left(\overline{A}_0 - \overline{A}_2\zeta_4^2\right) - z\left(\overline{A}_1\zeta_4 - \overline{A}_3\zeta_4^3\right).$$

FIG. 2 shows the data flow and the butterfly of an 8-point split-radix DGT according some embodiments of the present invention. In FIG. 2, dataflow and the proposed butterfly operators of low-complexity split-radix DGT and IDGT are provided, in which TW_1 and TW_2 are twiddle factors which are described in later Algorithm 1 and 2 as show in FIG. 3 and FIG. 4.

The details of the proposed split-radix DIT DGT are shown in Algorithm 1. The split-radix DGT butterfly in (Eq. 3A) is observed as being asymmetric, and different butterflies can be processed at boundary cases m=2,4. It is recommended to decompose the asymmetric butterfly operations as well as the butterfly operations in boundary cases into the similar butterfly operators. In the proposed algorithm of the present invention, four butterfly operators shown in FIG. 1 are applied, namely DGT 1, DGT 0-1, DGT 0-2, and DGT 0-3. Additionally, the order sequence of each of operators can be pre-computed and stored into an integer SEQ (i.e., the pre-computed integer). In some embodiments, a method is proposed to generate the SEQ as well as the corresponding control logic to select the target operator, as shown in Algorithm 1. The help function $br_l(i)$ can generate the bit reversal of integer i ranging from 0 to $(2^l-1)$. For example, $br_4(1011_b)=1101_b$. The help function $scramble_l(A)$ permutes the length-$2^l$ polynomial A, moving the i-th term to index $br_l(i)$.

The Proposed Split Radix IDGT:

The low complexity IDGT is derived in the split radix and decimation-in-frequency (DIF) nature. Given a length-m polynomial $\overline{\hat{A}}$, one has $\overline{A}=IDGT_m(\overline{\hat{A}})$. It is defined that $$\overline{W}_i = \overline{A}_{2i} \text{ for } 0 \le i < \frac{m}{2}, \overline{X}_i = \overline{A}_{4i+1} \text{ and } \overline{Y}_i = \overline{A}_{4i+3} \text{ for } 0 \le i < \frac{m}{4}.$$

The derivation of $\overline{W}_i$ is started by splitting the summation of IDGT into two groups according to the index of $\overline{\hat{A}}$ as follows:

$$\overline{A}_i = m^{-1}\zeta_m^{-i}\sum_{j=0}^{\frac{m}{2}-1}\left(\hat{\overline{A}}_j + \hat{\overline{A}}_{j+\frac{m}{2}}\zeta_m^{-4i\frac{m}{2}}\right)\zeta_m^{-4ji}, \quad \text{(Eq. 4)}$$

For $$0 \le i < \frac{m}{2},$$

(Eq. 4) is substituted into $\overline{W}_i = \overline{A}_{2i}$, and the scalability property is applied, in which substituting $(\zeta_m^{4m}) \equiv 1$ on $\langle_q[z]/\langle z^2+1\rangle$, as follows:

$$\overline{W}_i = m^{-1}\zeta_m^{-2}\sum_{j=0}^{\frac{m}{2}-1}\left(\hat{\overline{A}}_j + \hat{\overline{A}}_{j+\frac{m}{2}}\zeta_m^{-4mi}\right)\zeta_m^{2\times(-4ij)} \quad \text{(Eq. 5)}$$

$$= \left(\frac{m}{2}\right)^{-1}\zeta_{\frac{m}{2}}^{-i}\sum_{j=0}^{\frac{m}{2}-1}\left(\frac{\hat{\overline{A}}_j + \hat{\overline{A}}_{j+\frac{m}{2}}}{2}\right)\zeta_{\frac{m}{2}}^{-4ij}$$

$$= \left(\frac{m}{2}\right)^{-1}\zeta_{\frac{m}{2}}^{-i}\sum_{j=0}^{\frac{m}{2}-1}\overline{W}'_j\zeta_{\frac{m}{2}}^{-4ij},$$

with defining $$\overline{W}'_j\frac{\hat{\overline{A}}_j + \hat{\overline{A}}_{j+\frac{m}{2}}}{2}.$$

It is found that (Eq. 5) is equivalent to the length $$-\frac{m}{2} IDGT$$

of $\overline{W}'_j$. Thus, the subproblem of length m/2 is constructed.

To construct the other two subproblems of length $$-\frac{m}{4},$$

namely $\overline{X}_i$ and $\overline{Y}_i$ for $$0 \le i < \frac{m}{4},$$

again, the derivation is started from the definition of IDGT with post-processing, but splitting the summation to four groups according to the index of $\overline{\hat{A}}$. For $0 \le i < m$:

$$\overline{A}_i = m^{-1}\zeta_m^{-i}\sum_{j=0}^{\frac{m}{4}-1} \quad \text{(Eq. 6)}$$

$$\left(\hat{\overline{A}}_j + \hat{\overline{A}}_{j+\frac{m}{4}}\zeta_m^{-4i\frac{m}{4}} + \hat{\overline{A}}_{j+\frac{m}{2}}\zeta_m^{-4i\frac{m}{2}} + \hat{\overline{A}}_{j+\frac{3m}{4}}\zeta_m^{-4i\frac{3m}{4}}\right)\zeta_m^{-4ji}.$$

For $$0 \le i < \frac{m}{4},$$

(Eq. 6) is substituted into $\overline{X}_i = \overline{A}_{4i+1}$, and the scalability property is applied, in which substituting $(\zeta_m^{4m}) \equiv 1$ on $\mathbb{Z}_q[z]/\langle z^2+1\rangle$, and it is obtained:

$$\overline{X}_i = \overline{A}_{4i+1} = \quad \text{(Eq. 7)}$$

$$\left(\frac{m}{4}\right)^{-1}\zeta_{\frac{m}{4}}^{-i}\sum_{j=0}^{\frac{m}{4}-1}\left[\frac{1}{2}\left(\hat{\overline{A}}_j - \hat{\overline{A}}_{j+\frac{m}{2}}\right) + \frac{-z}{2}\left(\hat{\overline{A}}_{j+\frac{m}{4}} - \hat{\overline{A}}_{j+\frac{3m}{4}}\right)\right]\frac{\zeta_m^{-(4j+1)}}{2}\zeta_{\frac{m}{4}}^{-4ji}.$$

With Defining that:

$$\hat{\overline{X}}_j = \left[\frac{1}{2}\left(\hat{\overline{A}}_j - \hat{\overline{A}}_{j+\frac{m}{2}}\right) + \frac{-z}{2}\left(\hat{\overline{A}}_{j+\frac{m}{4}} - \hat{\overline{A}}_{j+\frac{3m}{4}}\right)\right]\frac{\zeta_m^{-(4j+1)}}{2}, \quad \text{(Eq. 8)}$$

The one can simplify (Eq. 7) as:

$$\overline{X}_i = \left(\frac{m}{4}\right)^{-1} \zeta_{\frac{m}{4}}^{-i} \sum_{j=0}^{\frac{m}{4}-1} \hat{X}_j \zeta_{\frac{m}{4}}^{-4ji}, \quad \text{(Eq. 9)}$$

It is found that (Eq. 9) are equivalent to the length $$-\frac{m}{4} IDGT$$

of $\overline{X}$. Thus, the subproblem of length m/4 is constructed. The subproblem $\overline{Y}_i = \overline{A}_{4i+3}$ for $$0 \le i < \frac{m}{4}$$

can also be constructed similar to (Eq. 7)-(Eq. 9). In summary, the split-radix DIF IDGT butterfly operations are defined as:

$$\hat{W}_j = \frac{1}{2}\left(\hat{A}_j + \hat{A}_{j+\frac{m}{2}}\right), \quad \text{(Eq. 10)}$$

$$\hat{W}_{j+\frac{m}{4}} = \frac{1}{2}\left(\hat{A}_{j+\frac{m}{4}} + \hat{A}_{j+\frac{3m}{4}}\right),$$

$$\hat{X}_j = \left[\frac{1}{2}\left(\hat{A}_j - \hat{A}_{j+\frac{m}{2}}\right) + \frac{-z}{2}\left(\hat{A}_{j+\frac{m}{4}} - \hat{A}_{j+\frac{3m}{4}}\right)\right]\frac{\zeta_m^{-(4j+1)}}{2},$$

$$\hat{Y}_j = \left[\frac{1}{2}\left(\hat{A}_j - \hat{A}_{j+\frac{m}{2}}\right) - \frac{-z}{2}\left(\hat{A}_{j+\frac{m}{4}} - \hat{A}_{j+\frac{3m}{4}}\right)\right]\frac{\zeta_m^{-3(4j+1)}}{2},$$

It is noted the two boundary cases at m=2,4. When m=2, the IDGT problem $\overline{A}_i$ can be solved as:

$$\overline{A}_0 = \frac{1}{2}\left(\hat{A}_0 + \hat{A}_1\right) \quad \text{(Eq. 11)}$$

$$\overline{A}_1 = \frac{1}{2}\left(\hat{A}_0 + \hat{A}_1 \zeta_2^{-4}\right)\zeta_2^{-1} = \frac{1}{2}\left(\hat{A}_0 - \hat{A}_1\right)\zeta_2^{-1}.$$

And, when m=4, the IDGT problem is solved as:

$$\overline{A}_0 = \frac{1}{2}\left(\frac{\hat{A}_0 + \hat{A}_2}{2} + \frac{\hat{A}_1 + \hat{A}_3}{2}\right), \quad \text{(Eq. 12)}$$

$$\overline{A}_1 = \frac{\zeta_4^{-1}}{2}\left(\frac{\hat{A}_0 - \hat{A}_2}{2} - z\frac{\hat{A}_1 - \hat{A}_3}{2}\right),$$

$$\overline{A}_2 = \frac{\zeta_4^{-2}}{2}\left(\frac{\hat{A}_0 + \hat{A}_2}{2} - \frac{\hat{A}_1 + \hat{A}_3}{2}\right),$$

$$\overline{A}_3 = \frac{\zeta_4^{-3}}{2}\left(\frac{\hat{A}_0 - \hat{A}_2}{2} + z\frac{\hat{A}_1 - \hat{A}_3}{2}\right).$$

FIG. 2 shows the data flow and the butterfly of an 8-point IDGT. The details of the split-radix DIF IDGT are shown in Algorithm 2. Help functions scramble$_I$ and br$_I$ are defined as afore-mentioned. Similar to DGT, the butterfly operations are decomposed as well as the boundary cases m=2,4 into multiple computing operators. In the proposed IDGT algorithm, three butterfly operators shown in FIG. 2 can be applied, namely DIF 1, DIF 0-1, DIF 0-2. It is observed that the proposed DGT and IDGT can share the pre-computed integer (SEQ), thus the memory overhead for operator selection can get reduced.

Complexity analysis on the split radix DGT/IDGT is provided herein.

To analyze the computation cost of split-radix DIT DGT, one can set up the recurrent equations based on the asymmetric split-radix butterflies and the two boundary cases. The number of modular multiplication and modular addition in a length-m DGT is defined as M(m) and A(m), respectively. Given the size of each sub-problems in (Eq. 3A) is m/4, one can find that m/2 additions over $\mathbb{Z}_q[z]/\langle z^2+1\rangle$ and m/2 multiplications over $\mathbb{Z}_q[z]/\langle z^2+1\rangle$ are needed in the first stage of split-radix DIT DGT butterfly computation. The second stage of the DGT butterfly computation involved m additions over $\mathbb{Z}_q[z]/\langle z^2+1\rangle$ but no multiplication. In summary, 3m/2 additions over $\mathbb{Z}_q[z]/\langle z^2+1\rangle$ and m/2 multiplications over $\mathbb{Z}_q[z]/\langle z^2+1\rangle$ are required to compute the length-m/4 sub-problem of split-radix DIT DGT. Recall that each addition over $\mathbb{Z}_q[z]/\langle z^2+1\rangle$ is separated into 2 modular additions, and each multiplication over $\mathbb{Z}_q[z]/\langle z^2+1\rangle$ involves 5 modular additions and 3 modular multiplications when using Karatsuba algorithm. Accordingly, 11m/2 modular additions and 3m/2 modular multiplications in GF(q) are required for the length-m/4 sub-problem of split-radix DIT DGT. Recall that when m=2, the DGT problem consists of 2 additions over $\mathbb{Z}_q[z]/\langle z^2+1\rangle$ and 1 multiplication over $\mathbb{Z}_q[z]/\langle z^2+1\rangle$ as shown in (Eq. 3B). Accordingly, 9 modular additions and 3 modular multiplications in GF(q) are required when m=2. Similarly, 31 modular additions and 9 modular multiplications are required when m=4.

Similar to the split-radix DIT DGT, the recurrence equations based on the asymmetric split-radix DIF IDGT butterfly and the two boundary cases (i.e., (Eq. 10), (Eq. 11), and (Eq. 12)) can be set up to analyze the computation cost. Observing that the split-radix DIF IDGT butterfly and the two boundary cases requiring the same number of multiplication and addition over $\mathbb{Z}_q[z]/\langle z^2+1\rangle$ as in DGT, the cost of the split-radix DIT DGT and the split-radix DIF IDGT can be represented in terms of modular multiplications M(m) and modular additions A(m) by the following recurrences:

$$M(m) = \begin{cases} M\left(\frac{m}{2}\right) + 2M\left(\frac{m}{4}\right) + 3m/2, & \text{if } m > 4, \\ 9, & \text{if } m = 4, \\ 3, & \text{if } m = 2. \end{cases}$$

$$A(m) = \begin{cases} A\left(\frac{m}{2}\right) + 2A\left(\frac{m}{4}\right) + 11m/2, & \text{if } m > 4, \\ 31, & \text{if } m = 4, \\ 9, & \text{if } m = 2, \end{cases}$$

such that, $$M(m) = m\log_2 m + \frac{m}{3} - \frac{(-1)^{\log_2 m}}{3},$$

$$A(m) = \frac{11m}{3}\log_2 m + \frac{5m}{9} - \frac{5(-1)^{\log_2 m}}{9}.$$

Having the above analysis, FIG. 5 shows Table III for illustrating comparison on the number of modular operations according to one aspect of the present disclosure. Table III compares the modular multiplication and modular addition of low complexity NTT/INTT, the classic DGT/IDGT, and the split-radix DGT/IDGT of the present invention for given problem sizes n. In terms of modular multiplication, the split-radix DGT/IDGT of the present invention has the smallest number of modular multiplications among the three algorithms. Comparing with the classic DGT and IDGT, split-radix DGT and IDGT reduce 47.3% and 57.8% of modular multiplications, respectively, when the polynomial size n=128 (i.e., DGT/IDGT size of $$m = \frac{n}{2} = 64).$$

The split-radix DGT and IDGT can also save 9.6% of modular multiplications compared to the low-complexity NTT and INTT. Similarly, the split-radix DGT/IDGT needs one less stage than the low-complexity NTT/INTT. The reason is that a length-n NTT/INTT is equivalent to a $$\text{length-}\frac{n}{2} \, DGT/IDGT$$

(which means the transform size is halved in DGT/IDGT compared to NTT/INTT). Additionally, as DIT is applied in DGT and DIF is used in IDGT, no bit-reordering on the coefficients is required.

The split-radix DGT and IDGT can be applied to solve the polynomial multiplication on $\mathbb{Z}_q[x]/\langle x^n+1 \rangle$ when $2n|(q-1)$ and n is a power of 2, and it is a more efficient variant as comparing with the classic DGT/IDGT. The split-radix DGT and IDGT can also provide a shorter transform length and need one less stage comparing with the other NTT/INTT algorithms. Thus, the split-radix DGT/IDGT of the present invention is competitive in the design of high-performance NWC architecture.

In the present invention, an architecture design is provided as well, which refers to an apparatus of cryptosystem with utilizing split-radix DGT/IDGT.

As afore mentioned, the CRYSTALS-KyberKEM adopted the parameter set (n,q) as (256,3329), which can divide the length-256 NTT into two length-128 NTTs of odd-index terms and the even-index terms, respectively. Considering using DGT to replace the length-128 NTT in CRYSTALS-KyberKEM, the pack operation (e.g., as shown in (Eq. 0)) is required to pack the odd-index terms and the even-index terms from $\mathbb{Z}_q$ into $\mathbb{Z}_q[z]/\langle z^2+1 \rangle$. Therefore, the DGT in CRYSTALS-KyberKEM consists of two length-64 DGTs for the odd-index terms and the even-index terms (i.e., which are noted as odd polynomial and even polynomial in this disclosure, respectively). Additionally, the available twiddle factor $\zeta_m$ in KyberKEM can be set as $\zeta_{64}=1+737*z$.

Figure 6:
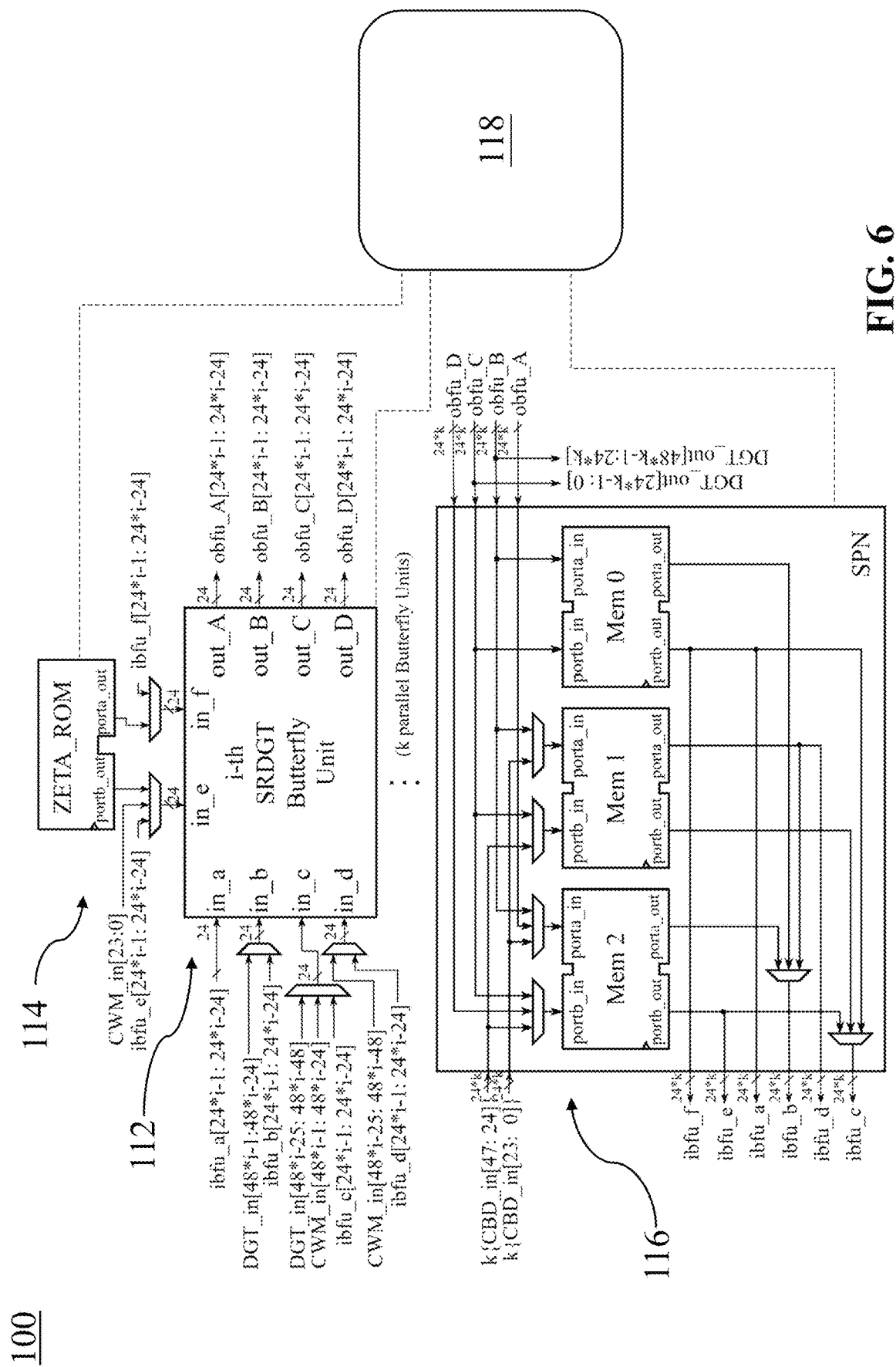
FIG. 6 depicts architecture of a cryptosystem processor for operating the split-radix DGT/IDGT according some embodiments of the present invention.

FIG. 6 depicts architecture of a cryptosystem processor 100 for operating the split-radix DGT/IDGT according some embodiments of the present invention. In order to cut down the hardware overhead on implementing the NWC via split-radix DGT/IDGT, it is decided to integrate the operation of the split-radix DGT, the split-radix IDGT, and the component-wise multiplication into a unified Split Radix DGT/IDGT (SRDGT) module.

As shown in FIG. 6, a cryptosystem processor 100 can be referred to as a unified SRDGT module including a SRDGT butterfly unit (SRDGT BFU) 112, a twiddle factor memory (ZETA_ROM) 114, a stream permutation network (SPN) 116, and a control unit 118 electrically communicating with the SRDGT BFU 112, the ZETA_ROM 114, and the SPN 116. In some embodiments, extensions to k parallel SRDGT BFUs 112 can be arranged, where k is noted as scalability coefficient. The index of each of the SRDGT BFUs 112 determines the route, ranging from 0 to k−1. The SPN 116 has Mem 0, Mem 1 and Mem 2 which are instantiated by dual-port random access memory (RAM). In some embodiments, each of the Mem 0, Mem 1 and Mem 2 can serve as a true dual-port random access memory. The ZETA_ROM 114 is instantiated by dual-port read only memory (ROM). In some embodiments, the ZETA_ROM 114 has a first ZETA port and a second ZETA port electrically communicating with the SRDGT BFU 112.

Figure 7A:
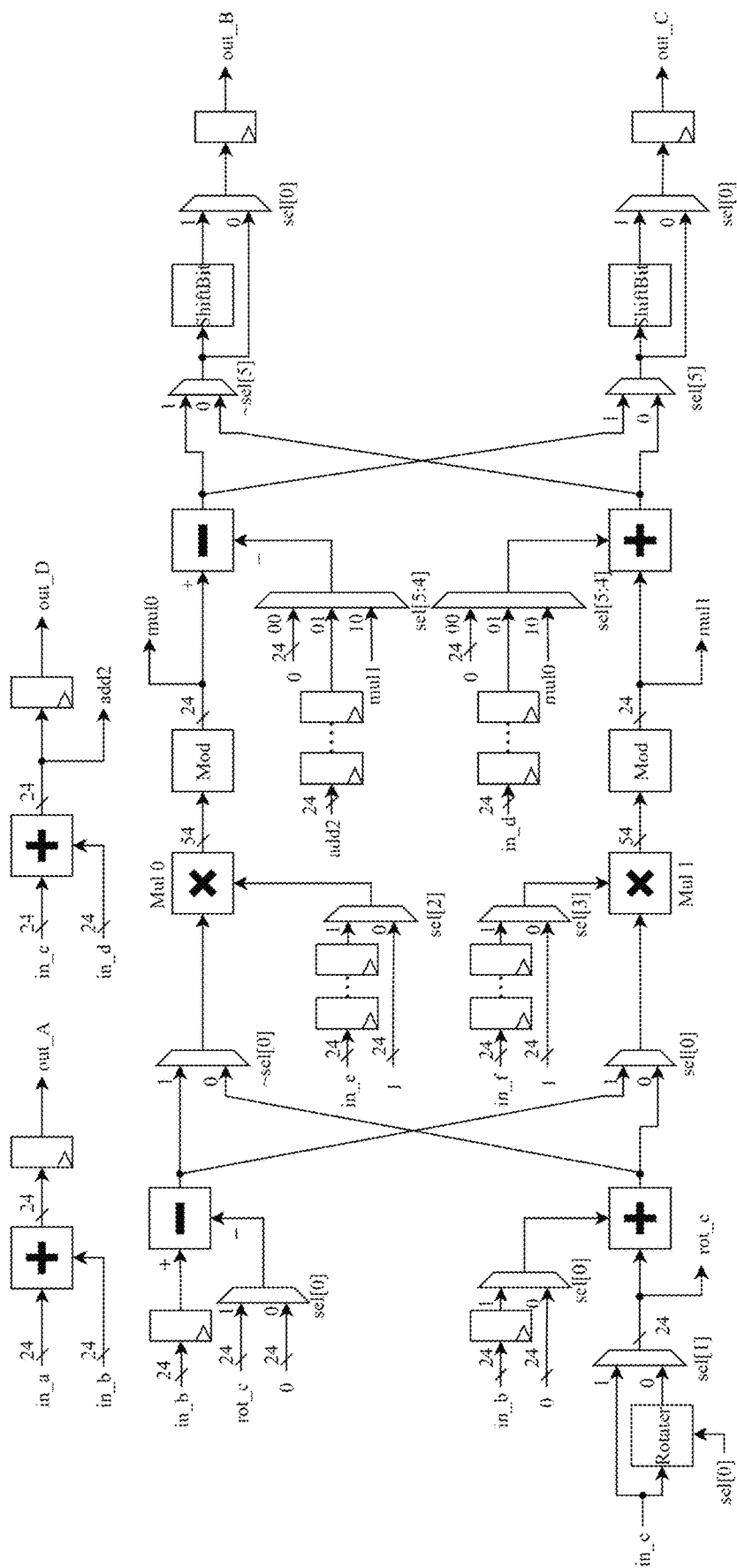
FIG. 7A and FIG. 7B illustrate detailed block diagrams of the SRDGT BFU according some embodiments of the present invention.
Figure 7B:
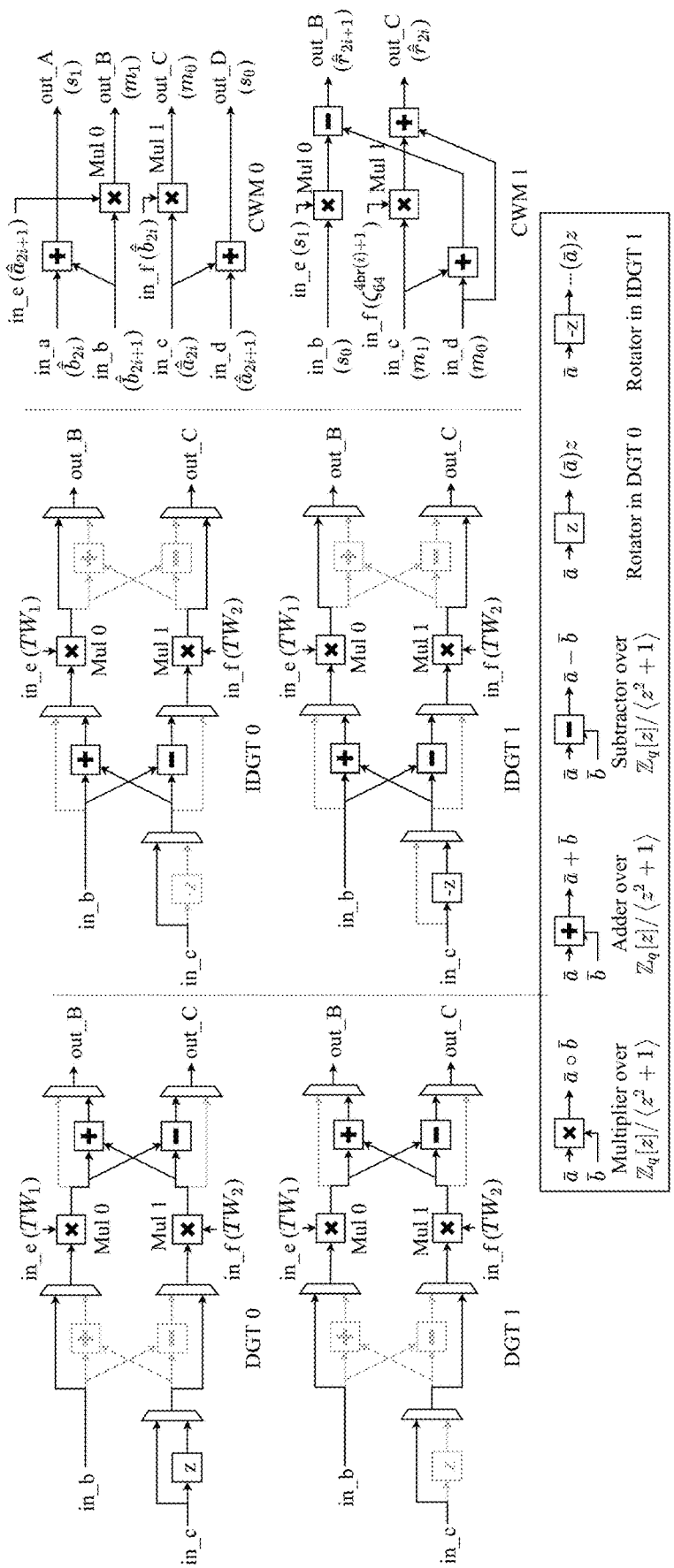

The unified SRDGT BFU 112 is designed to compute DGT and IDGT in iterative nature. FIG. 7A and FIG. 7B illustrate detailed block diagrams of the SRDGT BFU 112 according some embodiments of the present invention. FIG. 7B further illustrates the details of the active data path and the operators for each mode. Output ports out_A, out_B, out_C, out_D, are illustrated separately, with input ports in_a, in_b, in_c, in_d, in_e, in_f. In some embodiment, each the SRDGT BFU 112 includes six input ports and four output ports. Such the exact numbers for the input ports and the output ports are made for increase in hardware efficiency. Control signal "sel" in different operations can be found in Table IV, as shown in FIG. 7C. A pipelined architecture in FIG. 7A is designed to increase the throughput of the SRDGT BFU 112. When the pipeline is fulfilled, the SRDGT BFU 112 of the present invention can read and write two data points if working under DGT/IDGT mode. When the SRDGT BFU 112 is switched to compute under a component-wise multiplication (CWM) mode, the SRDGT BFU 112 of the present invention can support read and write of four data points simultaneously.

The SRDGT BFU 112 of the present invention is designed to support nine working modes to implement the SRDGT butterfly as shown in FIG. 2 in a compact way. The 6-bits control signal "sel" and its corresponding mode is shown in FIG. 7A and Table IV of FIG. 7C.

Among the nine working modes of the SRDGT BFU 112, four are for the iterative DGT (DGT 0-1, DGT 0-2, DGT 0-3, and DGT 1 as shown in FIG. 2), three are for the iterative IDGT (IDGT 0-1, IDGT 0-2, and IDGT 1 as shown in FIG. 2), and two are for CWM (CWM 0, and CWM 1). The modes for iterative DGT and IDGT need to be switched during the computation, as described in Algorithms 1 and 2. The SEQ can also be applied to controlling the mode switch. Since the computation of CRYSTALS-KyberKEM only involves length-64 DGT/IDGT, the SEQ can be a 32-bit constant integer 0X0000FF0D.

The CWM is defined as $$\left(x\hat{r}_{2i+1} + \hat{r}_{2i}\right) \bmod \left(x^2 - \zeta_{64}^{4br(i)+1}\right)$$

$$\equiv \left(x\hat{a}_{2i+1} + \hat{a}_{2i}\right)\left(x\hat{b}_{2i+1} + \hat{b}_{2i}\right),$$

By using the Karatsuba-based CWM approach, the number of multiplications over $\langle_q[z]/\mathbb{Z} z^2+1\rangle$ can be obtained via:

$$\hat{r}_{2i} = \hat{a}_{2i}\hat{b}_{2i} + \hat{a}_{2i+1}\hat{b}_{2i+1} \cdot \zeta_{64}^{4br(i)+1}, \qquad \text{(Eq. 13)}$$

$$\hat{r}_{2i+1} = \left(\hat{a}_{2i} + \hat{a}_{2i+1}\right)\left(\hat{b}_{2i} + \hat{b}_{2i+1}\right) - \left(\hat{a}_{2i}\hat{b}_{2i} + \hat{a}_{2i+1}\hat{b}_{2i+1}\right).$$

The Karatsuba-based CWM approach can be used for computation under using two working modes in the SRDGT BFU 112 of the present invention, namely CWM 0 and CWM 1. The computation of (Eq. 13) is mapped to the data flow of BFU as:

$$CWM\ 0: s_0 = \hat{a}_{2i} + \hat{a}_{2i+1},\ s_1 = \hat{b}_{2i} + \hat{b}_{2i+1}, \quad (Eq.\ 14)$$

$$m_0 = \hat{a}_{2i}\hat{b}_{2i},\ m_1 = \hat{a}_{2i+1}\hat{b}_{2i+1}$$

$$CWM\ 1: \hat{r}_{2i} = m_0 + m_1 \cdot \zeta_{64}^{4br(i)+1},$$

$$\hat{r}_{2i+1} = s_0 \cdot s_1 - (m_0 + m_1).$$

The detailed dataflow and working mechanism of the SRDGT BFU 112 are stated in FIG. 6 and Table IV as well.

The multiplier over $\mathbb{Z}_q[z]/\langle z^2+1 \rangle$ is provided herein.

Notice that each multiplication in (Eq. 13) multiplication over $\mathbb{Z}_q[z]/\langle z^2+1 \rangle$. Therefore, a multiplier over $\mathbb{Z}_q[z]/\langle z^2+1 \rangle$ is required to compute this operation.

The DSP48E1 slice in Xilinx FPGA consists of one multiplier and two adders. Since all the operators in DSP48E1 is programmable by fully utilizing these high performance hardware resources, one can design a high throughput multiplier over $\mathbb{Z}_q[z]/\langle z^2+1 \rangle$. In the present disclosure, the Karatsuba algorithm is adopted, with given $\bar{s}=(a)z+b$, $\bar{t}=(c)z+d$, the multiplication over $\mathbb{Z}_q[z]/\langle z^2+1 \rangle$ is rearranged and shown as:

$$\bar{s} \circ \bar{t} = [a(d-c) + c(a+b)\bmod q]z + [b(c+d) - c(a+b)\bmod q]. \quad (Eq.\ 15)$$

Figure 8:
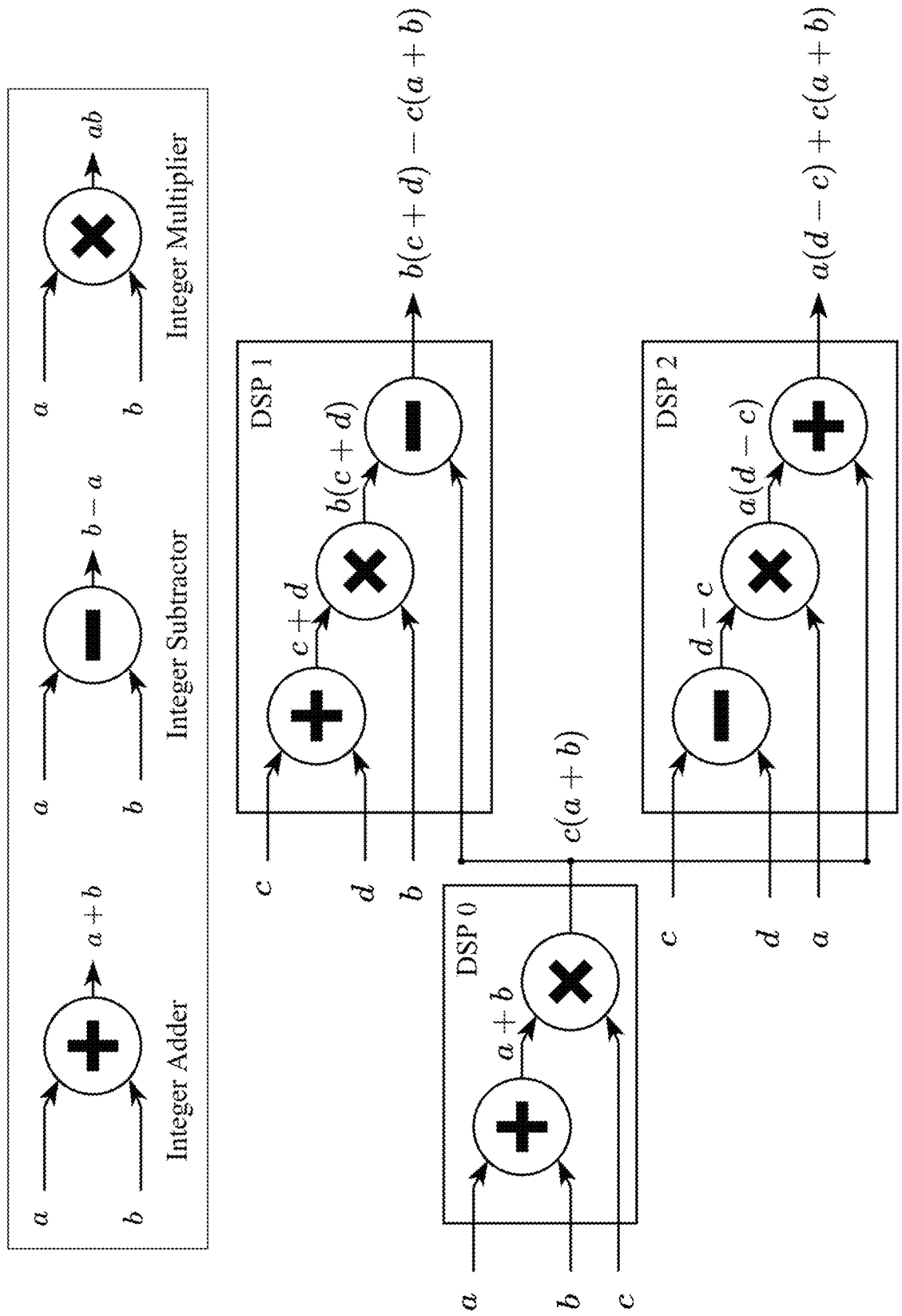
FIG. 8 illustrate an exemplary architecture of multiplier over $\mathbb{Z}_q[z]/\langle z^2+1\rangle$ according to one aspect of the present disclosure.

As can be seen from (Eq. 15), there are three multiplications, four additions, two subtractions, and two modular reductions in each multiplication over $\mathbb{Z}_q[z]/\langle z^2+1 \rangle$. In the present invention, mapping the whole computations in (Eq. 15) is provided into three DSP48E1, as shown in FIG. 8 which illustrate an exemplary architecture of multiplier over $\mathbb{Z}_q[z]/\langle z^2+1 \rangle$ with three DSP48E1 slices, so as to reduce the wiring delay between the logics and the DSP core. Regarding the illustration of FIG. 8, the rearranged multiplication over $\mathbb{Z}_q[z]/\langle z^2+1 \rangle$ is described in (Eq. 15). The architecture of $\mathbb{Z}_q[z]/\langle z^2+1 \rangle$ multiplier achieves a working frequency of 299 MHz on Xilinx Artix-7 platform.

Stream Permutation Network and Fully Pipelined Scheduling are provided herein.

In the present invention, the stream permutation network (SPN) and the data scheduling plan are designed to support two main goals for single SRDGT BFU (i.e., the SRDGT BFU 112 as afore described): (1) SPN can satisfy the bandwidth requirement of the SRDGT BFU; and (2) the schedule of SPN can ensure a fully pipelined working mode of DGT/IDGT.

The above goals can be achieved based on at least three features observable from FIG. 6, FIG. 7A, and FIG. 7B with the following statements:

1. The SRDGT BFU (i.e., the SRDGT BFU 112) can provide 4 active input ports in "DGT" and "IDGT" modes, and provide 6 active input ports in "CWM 0" mode, and provide 5 active input ports in "CWM 1" mode. In some embodiments, each SRDGT BFU has the minimum number of the input ports to support "DGT" and "IDGT" modes and "CWM 0" and "CWM 1" modes. For example, the SRDGT BFU has six input ports.

2. The 2 input data points from ZETA_ROM 114 (i.e., the twiddle factors $TW_1$ and $TW_2$) use specific datapath and does not dependent on the SPN 116. That is, the twiddle factors $TW_1$ and $TW_2$ are transmitted via datapath independent of the SPN 116. In some embodiments, the ZETA_ROM 114 electrically communicates with the SRDGT BFU 112 via two paths. One of the paths is from an output port of the ZETA_ROM 114 to an input port "in_e" of the SRDGT BFU 112 so as to transmit the twiddle factor $TW_1$ to the input port "in_e" of the SRDGT BFU 112. Another one of the paths is from an output port of the ZETA_ROM 114 to an input port "in_f" of the SRDGT BFU 112 so as to transmit the twiddle factor $TW_2$ to the input port "in_f" of the SRDGT BFU 112.

3. The pair of input ports that have the same data input (i.e., the port pairs (in_a, in_f) and (in_d, in_e) of the SRDGT BFU 112 in the "CWM 0" mode) can share one reading operation from the SPN 116.

Based on the above features, in some embodiments, the SPN 116 can support the required/desired numbers of data points reading/writing per cycle in the DGT/IDGT/CWM mode. For example, the SPN 116 can support 2/2/4 data points reading per cycle in the DGT/IDGT/CWM mode, respectively. Similarly, the SPN 116 can also support 2/2/4 data points writing per cycle in the DGT/IDGT/CWM mode, respectively.

In order to satisfy the SPN data width requirement, three true dual-port block RAM (BRAM), namely MEM 0, MEM 1, and MEM 2, as shown in FIG. 6 and labeled as MEM 0, MEM 1, and MEM 2, are placed or arranged to work in parallel. In some embodiments, the true dual-port BRAMs MEM 0, MEM 1, and MEM 2 serve as memory caches configured to store polynomial. Such the configuration enables a maximum 6 data points read/write simultaneously.

Figure 9:
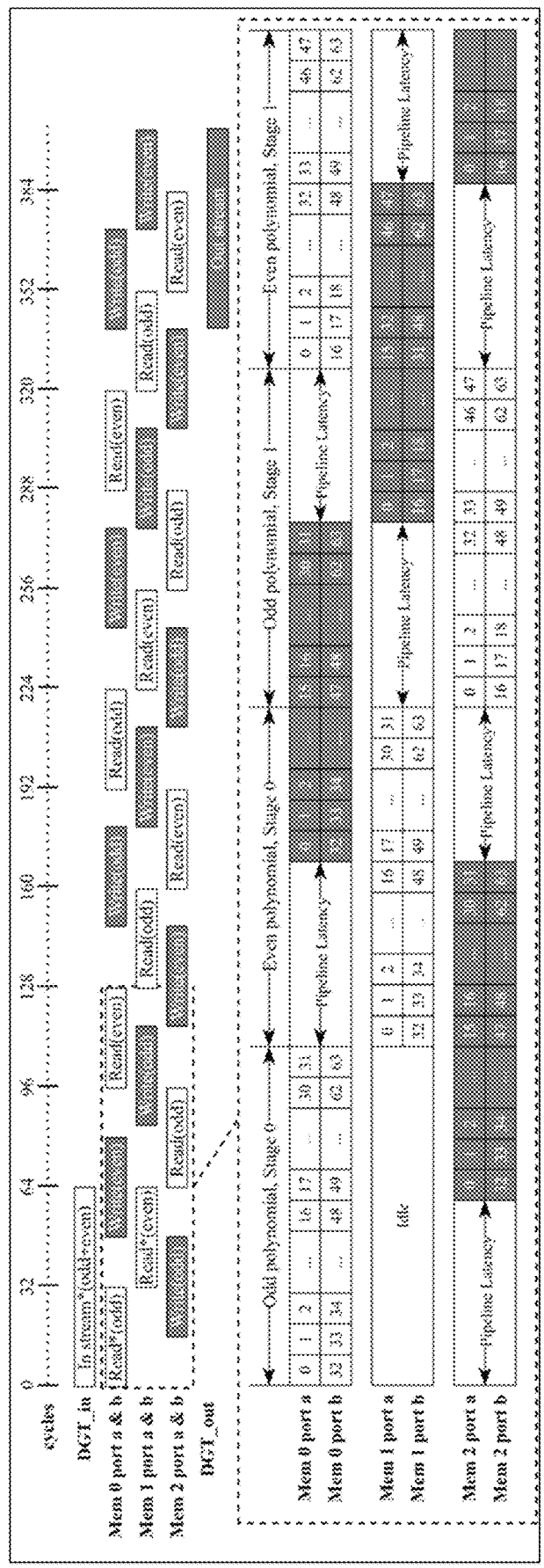
FIG. 9 depicts exemplary scheduling of memory operations for the SRDGT BFU according to one aspect of the present disclosure.

When the SRDGT BFU 112 works in DGT/IDGT mode, the two read ports of one BRAM and the two write ports of another BRAM are enabled. FIG. 9 depicts exemplary scheduling of memory operations for the SRDGT BFU 112 in KyberKEM. In some embodiments, two sources are acceptable: DGT_in or pre-stored in Mem 0 and Mem 1. When the input polynomial coming from DGT_in, the operation box "In stream*" are enabled and the "Read*" are disabled. When the input polynomial stored in Mem 0 and Mem 1, the operation boxes "Read*" are enabled and the "In stream*" are disabled. Detailed scheduling of memory operations in the first two stages are also shown below. In the illustration of FIG. 9, the white boxes represent Read operations, and the black boxes represent Write operations. The address of data is presented inside the boxes if applicable.

As shown in FIG. 9, this design enables 2 data points read and 2 data points write simultaneously. It is noted that the coefficients of the intermediate polynomial are stored in the memory in order, and each coefficient occupies one address in the BRAM. Such the configuration allows the cryptosystem processor 100 to use the memory address generating method stated in Algorithm 1 and 2 straightforwardly.

Figure 10:
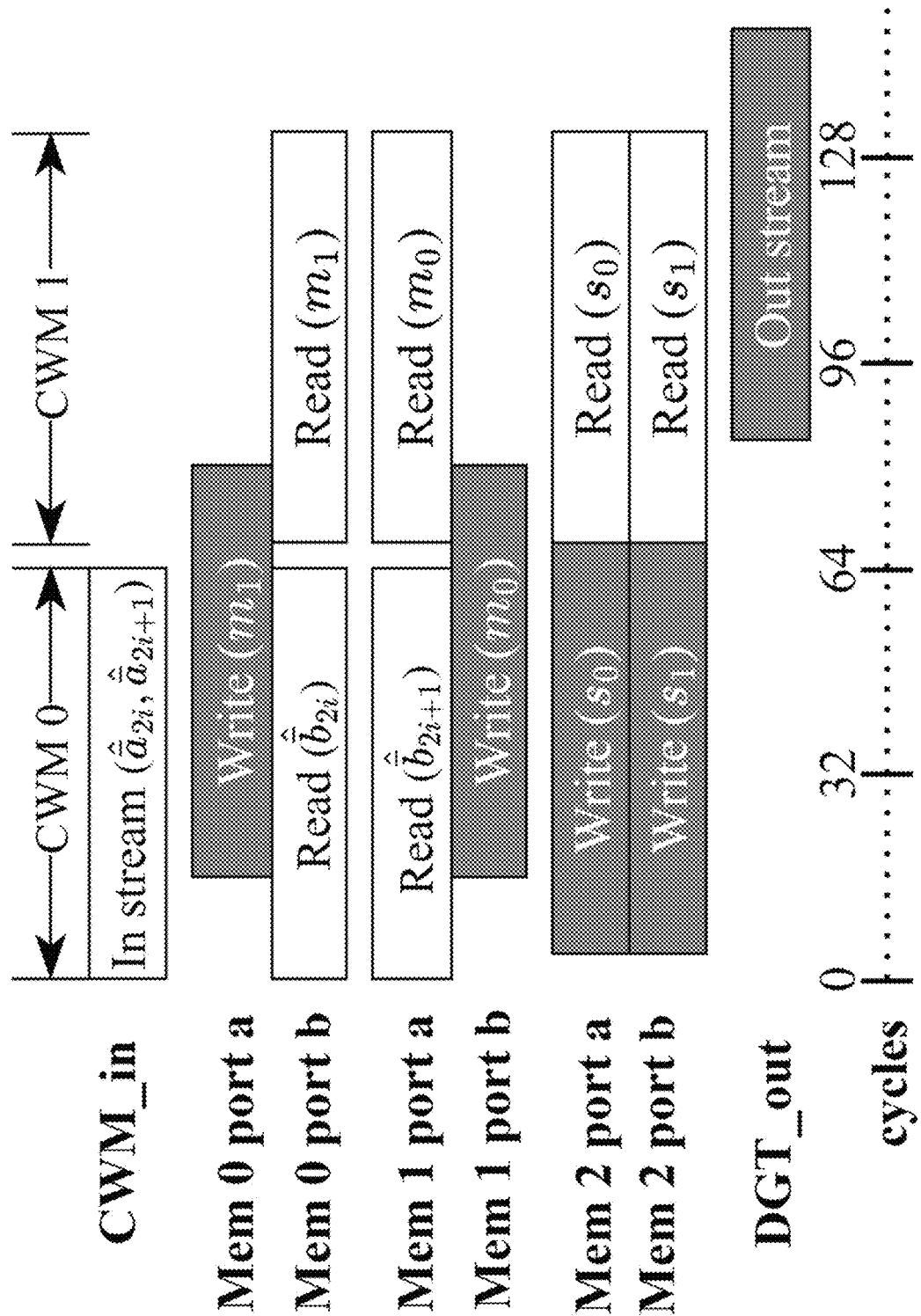
FIG. 10 depicts exemplary scheduling of memory operations for the CWM mode of according to some embodiments of the present invention.

In some embodiments, when the SRDGT BFU 112 works in CWM mode, there are 4 data points received by the SRDGT BFU 112 and 4 data points output from the SRDGT BFU 112 in each cycle. FIG. 10 depicts exemplary scheduling of memory operations for the CWM mode of according to some embodiments of the present invention. The data points in (Eq. 14) are noted on the BRAM ports in the working modes, "CWM 0" and "CWM 1". The read ports of "MEM 0 port b" and "MEM 1 port a" are enabled, and the write ports of "MEM 0 port a", "MEM 1 port b", "MEM 2 port a", and "MEM 2 port b" are enabled. As the data input port "CWM_in" also supports 2 data points input, the bandwidth requirement of the SPN is fulfilled.

The main challenge of implementing a fully pipelined iterative DGT/IDGT lies in the data dependency between adjacent transform stages. The fully pipelined scheduling plan of the present invention is specific for the DGT/IDGT in KyberKEM, consisting of two length-64 DGTs. The two length-64 DGTs are interspersed and processed alternately to eliminate the data dependency between adjacent transform stages. FIG. 9 provides a detailed example of memory scheduling for DGT in KyberKEM in the first two stages. This fully pipelined scheduling plan is also extended to compute IDGTs in KyberKEM.

The cycle count of the fully pipelined SRDGT BFU (i.e., the SRDGT BFU 112) and the state-of-the-art LC NTT are analyzed and compared then. The SRDGT BFU requires $2 \times 64/2 \times \log_2 64 = 384$ cycles for the length-64 DGTs of odd and even polynomials, and no pipelined bubble exists. Calculating the same length-128 NTT. LC NTT requires $128/2 \times \log_2 128 = 448$ cycles of odd and even polynomials, with additional 64 cycles of pipelined bubbles to write the results back to BRAMs. The above comparison demonstrates the advantages of the halved transform length DGT, the data scheduling plan, and the fully pipelined architecture of the present invention.

The extensions to multiple BFUs are provided herein. In KyberKEM, a higher security level requires more DGT computation tasks. In some embodiments, in order to support multiple tasks simultaneously, the extension to multiple the SRDGT BFUs 112 is available, as shown in FIG. 6. In some embodiments, each port of the SRDGT BFU 112 or the SPN 116 can receive or send a 24-bit wide data stream. If the scalability coefficient is noted as k, each memory block in the SPN 116 will be expanded to k×24 bit wide, corresponding to k SRDGT BFUs 112 operating simultaneously for k independent DGT/IDGT/CWM tasks. Meanwhile, since the bit width of the DGT data points is a multiple of 8, the extended Split Radix DGT architecture of the cryptosystem processor 100 can use the byte write function of the Xilinx BRAM instances to specify a storage location for the inputting data. Thus, the extended Split Radix DGT architecture of the cryptosystem processor 100 accepts a single polynomial or k polynomials that need to be operated simultaneously as inputs, improving the flexibility of the schedule when applied in the upper-level modules.

More features regarding hardware architecture of KyberKEM are provided herein.

In some embodiments, KyberKEM involves key generation, encapsulation, and decapsulation. In the present invention, hardware architecture is provided as shown in FIG. 11 which depicts the architecture of a KyberKEM-Split Radix DGT apparatus 200 according to some embodiments of the present invention.

Figure 11:
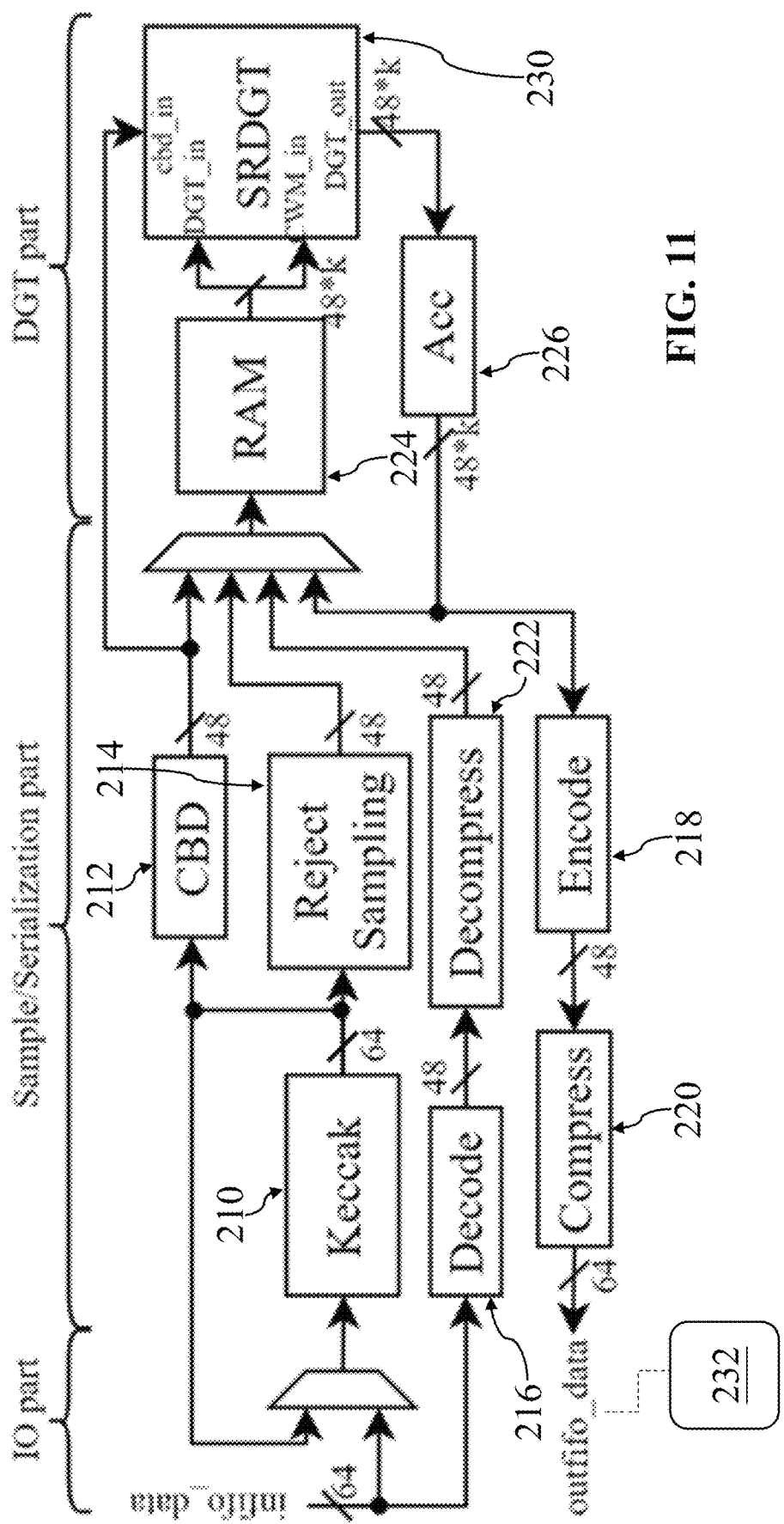
FIG. 11 depicts architecture of a Split Radix DGT apparatus according some embodiments of the present invention.

Referring to FIG. 11, the KyberKEM-Split Radix DGT apparatus 200 is configured to support the KyberKEM algorithms and includes a Keccak module 210, a centered binomial distribution (CBD) module 212, a reject sampling module 214, a decode module 216, an encode module 218, a compress module 220, a decompress module 222, a RAM module 224, an accumulator (ACC) module 226. The KyberKEM-Split Radix DGT apparatus 200 further includes a split radix DGT module 230, which is identical with or similar to the cryptosystem processor 100 as afore-described. The components and modules of the KyberKEM-Split Radix DGT apparatus 200 can be electrically communicated with each other as arrows shown in FIG. 11. For example, the RAM module 224 electrically communicates with the split radix DGT module 230. Herein, electrically communication includes indirectly coupling; for example, the split radix DGT module 230 indirectly coupled with the encode module 218 via the ACC module 226 can be stated as electrically communicating with the encode module 218.

The CBD module 212 and the reject sampling module 214 can be configured to perform sampling in the functions $CBD_\eta$ and Parse, respectively. The compress and decompress modules 220, 222 are responsible for the compress and decompress of ciphertext, respectively. The encode module 218 is configured to transfer the data format from the byte array to the coefficients of a polynomial, and the decode module 216 transfers the coefficients of a polynomial back to the byte array. The encode and decode modules 218 and 216 are modified from the open-source code. The Keccak module 210 is configured to compute the functions of SHAKE128, SHAKE256, SHA3-256, and SHA3-512. The functionality of the Keccak module 210 is expanded from the open-source code, and it will take 24 clock cycles to execute 24 rounds in the function KECCAK-f.

The bandwidth matching carrying through the architecture is used to increase the area time efficiency. In addition, the entire structure is divided into three parts, with different data bit widths for different parts. The advantage of setting bandwidth matching in different parts is the overall hardware latency, and the consumed resources can trade off based on the security level. The data bandwidth is 64 bits, 48 bits, and 48×k bits in the I/O part, the sample/serialization part, and the DGT part, respectively, where k is the security level parameter of KyberKEM and equals to the scalability parameter in the split radix DGT module 230 (i.e., the cryptosystem processor 100) as afore defined. The I/O part includes the input and output FIFOs, working as the input/output buffer of the architecture. In the sample/serialization part, the byte array from input FIFO can be sent to the Keccak module 210 to sample and the decode module 216 to de-serialize into 48-bit width. The compress module 220 is able to accept the 48-bit-width data from the encode module 218 and serialize it to 64-bit width data for the output FIFO. In some embodiments, the KyberKEM-Split Radix DGT apparatus 200 may further include a data register 232, which electrically communicates with the compress module and is configured to store the 64-bit width data from the compress module 220. The RAM module 224 is configured to store the sampling polynomials from the CBD module 212 and the reject sampling module 214 and the decompressed polynomials from the decompress module 222 (i.e., the decompress module 222 can be configured to decompress polynomials). The byte write function of the Xilinx BRAM instance can be used in the RAM module 224 to facilitate the flexibility of the write bandwidth. In some embodiments, when k polynomials for DGT/IDGT/CWM are ready, the SRDGT module with the split radix DGT module 230 (i.e., the cryptosystem processor 100) will load these k polynomials and process them simultaneously. In some embodiments, the KyberKEM-Split Radix DGT apparatus 200 may further include control units, the input and output FIFOs.

In present invention, the just-in-time strategy is applied to minimize the memory footprint. The just-in-time strategy means that the sampling polynomials are generated based on the requirement of the succeeding computation. For example, the strategy is applied for the data generated by reject sampling module 214. The reject sampling module 214 samples the output from the Keccak module 210 under the uniform distribution. The output of the reject sampling module 214 is stored in the RAM module 224, including Â in key generation and $Â^T$ in encryption, and can get passed to the SRDGT module with the split radix DGT module 230 (i.e., the cryptosystem processor 100) until k polynomials are ready. Each of these polynomials in the cases can be used only once. Thus, the memory space can be overwritten by the following k polynomials based on the just-in-time strategy, and the memory space reserved can get reduced from $k^2$ polynomials to k polynomials.

The implementation results and comparisons are provided herein.

The hardware design of KyberKEM-SRDGT of the present invention has been synthesized and implemented using Vivado 2019.2 design suite on Xilinx XC7A200 (Artix-7) FPGA device, with all the building blocks implemented in hardware.

Regarding split-radix DGT module results and comparisons, the hardware resource utilization and the latency specification of the SRDGT module are shown in Table V in FIG. 12. The detailed cycle counts of NTT (DGT), INTT (IDGT), and component-wise multiplication (CWM) are also compared with state-of-the-art implementations. The k=1 case of the present invention is only enclosed for a fair comparison since the design of the present invention with larger k is designed to process k independent polynomials simultaneously. The measurement of the efficiency of the hardware implementations is based on the area-time product (ATP), which is computed by the product of LUT, BRAM, and DSP resources and the computing time. The ATP for NTT and CWM for a detailed comparison are analyzed. Notably, the comparison of the total latency and ATP is not included for the polynomial multiplication in Table V, since it is noted that the KyberKEM does not use the complete polynomial multiplication (including 2 NTTs, 1 CWM, and 1 INTT) during the key generation, encapsulation and decapsulation. For simplicity, the ATP ratios are provided instead of the original ATP indices.

Due to the careful placement of registers and the usage of high-speed DSP48E1 slides in Artix-7 FPGA, the SRDGT module is able to operate at a frequency of 239 MHz. Another merit of the SRDGT algorithm and the architecture is the relatively small cycle count. Specifically, the DGT, IDGT and CWM computations require 384, 384, and 132 cycles, respectively, for length-256 polynomial multiplication. And the latency of DGT, IDGT and CWM are 1.6 µs, 1.6 µs, and 0.55 µs, respectively.

In comparison to the SW implementation, the cycle count of the SRDGT architecture achieves a speedup of 20.1×, 24.3×, 211.2× for NTT (DGT), INTT(IDGT), and CWM, respectively. In comparison to the HW/SW implementations, the SRDGT hardware achieves more than 32.4× speedup for NTT (DGT) computation. Besides, some related works use 1.86× and 1.81× more LUTs than design of the present disclosure in a similar FPGA platform, respectively.

The state-of-the-art HW implementations are divided into two groups depending on whether the CWM is supported. The hardware in some related works support CWM. One of the related works has a higher NTT ATP ratio in LUT, BRAM, and DSP compared to the architecture of the present invention, indicating the high efficiency of our architecture. The architecture of the present invention still has lower cycle counts because the transform size is halved, and only six stages are required in our split radix DGT and IDGT, with the full-pipelined working nature provided by the SPN. One of the related works also presented a unified butterfly unit for NTT, INTT, and CWM. However, taking advantage of the novel split-radix DGT algorithm of the present invention, the cycle count of the present invention is only 384/512=75% of the counts in the previous work for NTT (DGT), and only 132/256=51.6% of the counts in the previous work for CWM. The architecture of the present invention outperforms the NTT ATP and CWM ATP compared to the previous work except for the NTT-DSP ATP because of the compact design in the unified BFU of the previous work. One of the related works proposes three different configurations to trade off the hardware resources and speed. The architecture of the present invention outperforms all these configurations concerning the LUT-NTT and BRAM-NTT ATP, while their work can have a better DSP-NTT ATP. Besides, the architecture of the present invention outperforms the CWM ATP ratios for LUT, BRAM, and DSP compared to the related works.

The clock cycle counts of NTT (DGT) and INTT (IDGT) are used, unlike directly using the ATP of the NTT and CWM when comparing the architecture of the present invention with related works for fairness since these works do not support CWM while the architecture of the present invention uses additional hardware resources for CWM.

Regarding KyberKEM results and comparisons, an ATP ratio is the normalized product of FPGA resources and the total time by setting the architecture of the present invention as baseline. FIG. 13 depicts Table VI for showing the hardware resource utilization and the latency of the proposed KyberKEM hardware system. Different security level parameter sets, including Kyber-512-CCA, Kyber-768-CCA, and Kyber-1024-CCA, are implemented, and the results are compared with the state-of-the-art implementations concerning speed and hardware resource utilization. The speed of the hardware is obtained by taking the cycle counts and total time, including the key generation, encapsulation, and decapsulation. For simplicity, the total cycle ratio is provided in Table VI using results of the architecture of the present invention as the baseline. The overall efficiency of the hardware architecture is mainly measured by the ATP ratio, obtained by the product of LUT, BRAM, and DSP resources and the total time (noted as LUT-Time ATP, BRAM-Time ATP, and DSP-Time ATP, respectively), and normalized using our results as the baseline.

In the KyberKEM architecture with the SRDGT module of the present invention, all the dimensions k defined in KyberKEM specification are supported. The data bandwidth of implementation of the present invention is set to 64 bits. The design of the present invention achieves more than 227.6× speedup when compared with one of the related works, which is software implementation on ARM Cortex-M4. Compared with the HW/SW co-design in one of the related works, the architecture of the present invention achieves at least 43.8× speedup and 340.5/333.5/163.8× smaller LUT-Time ATP, BRAM-Time ATP, and DSP-Time ATP, respectively, among all the security level of KyberKEM.

The architecture of the present invention is compared with the related pure hardware implementations. For all the security levels of KyberKEM, the hardware corresponding to the architecture of the present invention obtains at least 1.0×, 2.1×, 2.8×, and 10.7× speedup compared with some of the related works, respectively. Compared with one of the related works, the architecture of the present invention utilizes 1.0/0.6/0.4×ATP in Kyber-512-CCA, but only 0.7/0.5/0.3×ATP in Kyber-1024-CCA, in terms of LUT-Time ATP, BRAM-Time ATP, and DSP-Time ATP, respectively. The reason may be that the KyberKEM architecture of the present invention can benefit more from the Split Radix DGT module at a lower security level. Nevertheless, at a higher security level, the schedule bottleneck can be Keccak and Reject Sample (modules), but not the Split Radix DGT (module). This fact will cause the total cycle gap between the design of the architecture of the present invention and one of the related works to decrease gradually, namely from 1.3× to 1.0× total cycles from Kyber-512-CCA to Kyber-1024-CCA.

As discussed above, the development of quantum computers threatens the security of the conventional public-key cryptography algorithms. CRYSTALS-KyberKEM is one of the leading algorithms in the ongoing NIST Post-Quantum Cryptography (PQC) competition. As a lattice-based cryptographic scheme, the efficiency of CRYSTALS-KyberKEM is dependent on the polynomial multiplication over $R_q$ or equivalently NWC.

In the present disclosure, the implementation of DGT with the split-radix method is explored, thereby providing a higher level of parallelism compared to the LC NTT and less computational complexity compared to classic DGT. The architecture of split-radix DGT module of the present invention can support DGT, IDGT and CWM specific for KyberKEM, and outperforms the state-of-the-arts on NWC modules. In the meantime, KyberKEM architecture with split-radix DGT module of the present invention is configured to support all the security levels of KyberKEM.

The architecture of the present invention can increase performance and hardware efficiency than the state-of-the-arts. In some experiments, there are specifically only 35.7 µs, 47.6 µs, and 68.6 us required for Kyber-512-CCA. Kyber-768-CCA and Kyber-1024-CCA, respectively.

ROM, RAM, and other logical components can be realized through a well-designed layout that incorporates a range of physical components. In some embodiments, this includes the incorporation of passive elements like resistors, inductors, and capacitors, which are crucial for regulating current flow and stabilizing voltage levels. In some embodiments, active elements such as transistors and integrated circuits are arranged in specific embodiments to amplify and control signals within the system. In some embodiments, the layout is further supported by the presence of interconnecting wires and conductive traces, which enable seamless transmission of signals between components.

The functional units and modules of the apparatuses and methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A cryptosystem processor for operating split-radix discrete Galois transformation/inverse discrete Galois transformation, comprising:
   a twiddle factor memory instantiated by dual-port read only memory (ROM) and having a first port and a second port;
   at least one split radix discrete Galois transformation/inverse discrete Galois transformation butterfly unit (SRDGT BFU) having six input ports and four output ports and switchable among operation in a discrete Galois transformation (DGT) mode, an inverse discrete Galois transformation (IDGT) mode, or a component-wise multiplication (CWM) code, wherein two of the input ports of the SRDGT BFU electrically communicate with the first port and the second port of the twiddle factor memory, respectively, allowing transmission of twiddle factors from the twiddle factor memory to the SRDGT BFU, wherein the SRDGT BFU is configured to read and write two data points when working under the DGT or IDGT mode and is configured to read and write four data points when working under the CWM mode; and
   a stream permutation network (SPN) electrically communicating with the SRDGT BFU and having a first dual-port block random access memory (BRAM), a second dual-port BRAM, and a third dual-port BRAM which serve as memory caches configured to store polynomial, wherein the SPN is configured to support the required number of data points reading or writing per cycle in the DGT mode, IDGT mode, or the CWM mode.

2. The cryptosystem processor of claim 1, wherein the twiddle factor memory is configured to provide two input data points as the twiddle factors, and the transmission of the twiddle factors from the twiddle factor memory to the SRDGT BFU is achieved through the first port and the second port via a datapath independent of the SPN.

3. The cryptosystem processor of claim 1, wherein the first dual-port BRAM, the second dual-port BRAM, and the third dual-port BRAM are further configured to store coefficients of intermediate polynomial in order, and each of the coefficients occupies one address in at least one of the first dual-port BRAM, the second dual-port BRAM, and the third dual-port BRAM.

4. The cryptosystem processor of claim 1, wherein the first dual-port BRAM, the second dual-port BRAM, and the third dual-port BRAM are arranged to work in parallel.

5. The cryptosystem processor of claim 1, wherein a total of the k SRDGT BFUs are arranged parallelly, where k is noted as scalability coefficient.

6. The cryptosystem processor of claim 5, wherein each memory block in the SPN is expanded to k×24 bit wide, corresponding to the k SRDGT BFUs operating simultaneously for a total of k independent DGT/IDGT/CWM tasks.

7. The cryptosystem processor of claim 6, wherein the k SRDGT BFUs in combination with the SPN and the twiddle factor memory is further configured to accept k polynomials that need to be operated simultaneously as inputs.

8. The cryptosystem processor of claim 6, wherein the SPN is further configured to support two data points reading per cycle in the DGT mode, two data points reading per cycle in the IDGT mode, and four data points reading per cycle in the CWM mode.

9. The cryptosystem processor of claim 6, wherein the SPN is further configured to support two data points writing per cycle in the DGT mode, two data points writing per cycle in the IDGT mode, and four data points writing per cycle in the CWM mode.

10. A split radix discrete Galois transformation (DGT) apparatus, comprising:
    the cryptosystem processor of claim 1;
    a RAM module electrically communicating with the cryptosystem processor and configured to store polynomials and to pass the polynomials into the cryptosystem processor; and
    an input/output part configured to work as an input/output buffer for the architecture of the split radix DGT apparatus.

11. The split radix DGT apparatus of claim 10, further comprising:
    a decompress module electrically communicating with the RAM module and configured to decompress the polynomials such that the RAM module stores the decompressed polynomials from the decompress module.

12. The split radix DGT apparatus of claim 11, further comprising:
    a decode module electrically communicating with the decompress module and configured to transfer data format from coefficients of a polynomial back to a byte array; and
a encode module electrically communicating with the cryptosystem processor and configured to transfer data format from byte array to coefficients of a polynomial.

13. The split radix DGT apparatus of claim 12, further comprising:
    a compress module electrically communicating with the encode module and configured to accept 48-bit-width data from the encode module and to serialize it to 64-bit width data.

14. The split radix DGT apparatus of claim 13, further comprising:
    a data register electrically communicating with the compress module and configured to store the 64-bit width data from the compress module.

* * * * *